US008892484B2

(12) United States Patent  (10) Patent No.: US 8,892,484 B2
Sipple  (45) Date of Patent: Nov. 18, 2014

(54) SYSTEM AND METHOD FOR PREDICTING EVENTS

(71) Applicant: Sphere of Influence, Inc., McLean, VA (US)

(72) Inventor: John A. Sipple, Germantown, MD (US)

(73) Assignee: Sphere of Influence, Inc., McLean, VA (US)

( * ) Notice: Subject to any disclaimer, the term of this patent is extended or adjusted under 35 U.S.C. 154(b) by 238 days.

(21) Appl. No.: 13/631,787

(22) Filed: Sep. 28, 2012

(65) Prior Publication Data

US 2014/0095425 A1  Apr. 3, 2014

(51) Int. Cl.
G06E 1/00 (2006.01)
G06N 5/02 (2006.01)
G06N 7/00 (2006.01)

(52) U.S. Cl.
CPC . *G06N 5/02* (2013.01); *G06N 7/005* (2013.01)
USPC .......................................................... 706/21

(58) Field of Classification Search
None
See application file for complete search history.

(56) References Cited

U.S. PATENT DOCUMENTS

2011/0288839 A1* 11/2011 Horvitz et al. .................... 703/6
2012/0150782 A1* 6/2012 Benson et al. ................. 706/45

OTHER PUBLICATIONS

O'Brien, Sean P., "Crisis Early Warning and Decision Support: Contemporary Approaches and Thoughts on Future Research," International Studies Review (2010) vol. 12, pp. 87-104.
Radinsky, Kira et al., "Learning Causality for News Events Prediction," WWW 2012-Session: Web Mining, Apr. 16-20, 2012, Lyon, France, pp. 909-918.
Gerner, Deborah J., et al., "The Creation of CAMEO (Conflict and Mediation Event Observations): An Event Data Framework for a Post Cold War World," Department of Political Science, University of Kansas, (2002) pp. 1-29.
Bond, Doug, et al., "Integrated Data for Events Analysis (IDEA): An Event Typology for Automated Events Data Development," Journal of Peace Research, vol. 40, No. 6 2003, pp. 733-745.
Schrodt, Philip A., "TABARI—Textual Analysis by Augmented Replacement Instructions," Dept. of Political Science, University of Kansas, Blake Hall, Version 0.7.3B3: Jul. 1, 2009, pp. 1-137.
Addis, Donna R., et al., "Remembering the past and imagining the future: Common and distinct neural substrates during event construction and elaboration," Neuropsychologia 45 (2007) pp. 1363-1377.
Truve, Staffan, PhD, "Big Data for the Future: Unlocking the Predictive Power of the Web," Recorded Future—Unlock the Predictive Power of the Web, 2011,15 pages.

* cited by examiner

*Primary Examiner* — Alan Chen
(74) *Attorney, Agent, or Firm* — Marc S. Kaufman; Reed Smith LLP

(57) ABSTRACT

A method and apparatus for predicting significant future events based on previous events. Plural messages representing events are received. Attributes of the messages are mapped to respective feature dimensions to define a multidimensional histogram. Co-occurrence of at least two event types are determined based on queries of the multidimensional histogram. Anomalous event types are detected from the messages by comparing feature dimensions of incoming messages to probability density functions of the cluster corresponding to the event type and highly anomalous event types are determined. Causal relationships between each pair of event types are determined and a Bayesian belief network of the pairs of event types is created and used to predict future events based on occurrence of additional events.

6 Claims, 27 Drawing Sheets

FIG. 8

| Event Type | | Haiti, January 10 | | | Haiti, October 10 | | England, August 11 | | | | |
|---|---|---|---|---|---|---|---|---|---|---|---|
| | | Port-Au-Prince 12-Jan-10 | Saint-Marc 12-Jan-10 | Port-de-paix 20-Jan-10 | Port-Au-Prince 10-Oct-10 | Saint-Marc 10-Oct-10 | Sheffield 11-Aug-11 | Birmingham 11-Aug-11 | Bristol 11-Aug-11 | London 11-Aug-11 | Leeds 11-Aug-11 |
| Property Damage | Public Property Damage | 120 | 30 | 12 | 30 | 50 | | 10 | 20 | 200 | 50 |
| | Private Property Damage | 105 | 20 | 26 | 10 | 50 | | 20 | 30 | 120 | 60 |
| Natural Disaster | Earthquake | 600 | 460 | 12 | 500 | 350 | | | | | |
| | Tsunami | | | | | | | | | | |
| | Hurricane | | | | | | | | | | |
| Force Use | Riot | | | | | | | 20 | 20 | 250 | 30 |
| | Arrest | | | | | | | | 20 | 120 | 10 |
| Economic Status | Recession | | | | | | 50 | 100 | 120 | 500 | 200 |
| Infectious Human Illness | Cholera | | | 10 | 200 | 120 | | | | | |

Table 800

| Event Type | | Haiti, January 10 | | | Haiti, October 10 | | England, August 11 | | | | | | | | |
|---|---|---|---|---|---|---|---|---|---|---|---|---|---|---|---|
| | | Port-Au-Prince 12-Jan-10 | Saint-Marc 12-Jan-10 | Port-de-paix 20-Jan-10 | Port-Au-Prince 10-Oct-10 | Saint-Marc 10-Oct-10 | Sheffield 11-Aug-11 | Birmingham 11-Aug-11 | Bristol 11-Aug-11 | London 11-Aug-11 | Leeds 11-Aug-11 | State- | Religious | Police | Local Gvt |
| Property Damage | Public Property Damage | 120 | 30 | 12 | 30 | 50 | | 10 | 20 | 200 | 50 | | | | |
| | Private Property Damage | 20 | 10 | 1 | 5 | 3 | | | 4 | 80 | 20 | | | | |
| Natural Disaster | Earthquake | 60 | 1 | 5 | 40 | | | | 2 | | | | | | |
| | Tsunami | 10 | | 10 | 1 | | | | 90 | 15 | | | | | |
| | Hurricane | | | 6 | | | | | 28 | 15 | | | | | |
| | Riot | 30 | | 10 | | | 3 | 13 | | 120 | 10 | | | | |
| Force Use | Arrest | | | | | | 50 | 100 | 120 | 500 | 200 | | | | |
| Economic Status | Recession | | | 10 | 200 | 120 | | | | | | | | | |
| Infectious Human Illness | Cholera | | | | | | | | | | | | | | |

FIG. 13
| Event type | Histogram Counts | | | | | | | | | | Correlation | | |
|---|---|---|---|---|---|---|---|---|---|---|---|---|---|
| | | | | | | | | | | | Coefficient | Confidence | Distance |
| Riot | 0 | 0 | 0 | 0 | 0 | 0 | 20 | 20 | 250 | 30 | 0.99 | 100% | 0.4 |
| Arrest | 0 | 0 | 0 | 0 | 0 | 0 | 0 | 20 | 120 | 10 | | | |
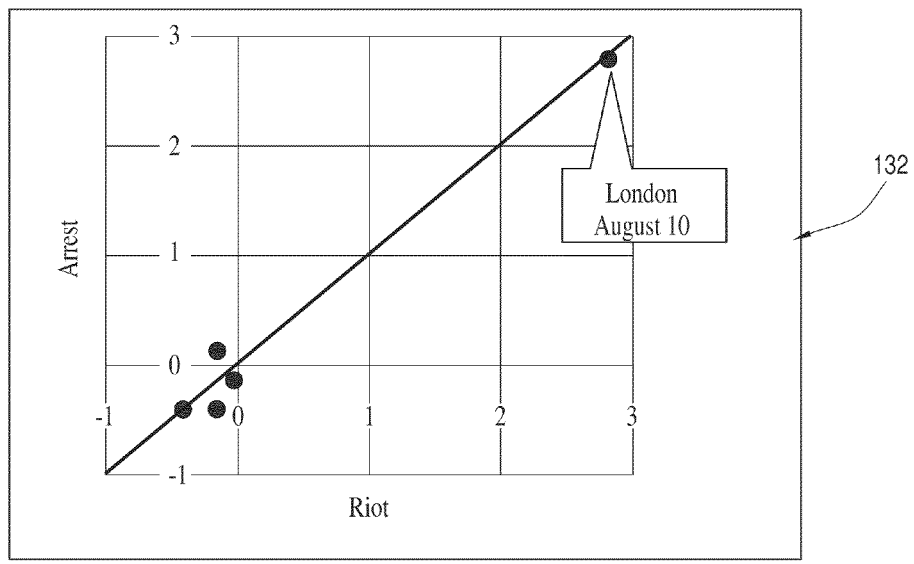
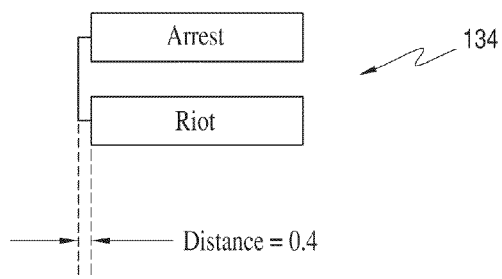

FIG. 14
| Event type | Histogram Counts | | | | | | | | | | Correlation | | |
|---|---|---|---|---|---|---|---|---|---|---|---|---|---|
| | | | | | | | | | | | Coefficient | Confidence | Distance |
| Earthquake | 600 | 460 | 12 | 500 | 350 | 0 | 0 | 0 | 0 | 0 | -0.34 | 19% | 74.7 |
| Arrest | 0 | 0 | 0 | 0 | 0 | 0 | 0 | 20 | 120 | 10 | | | |
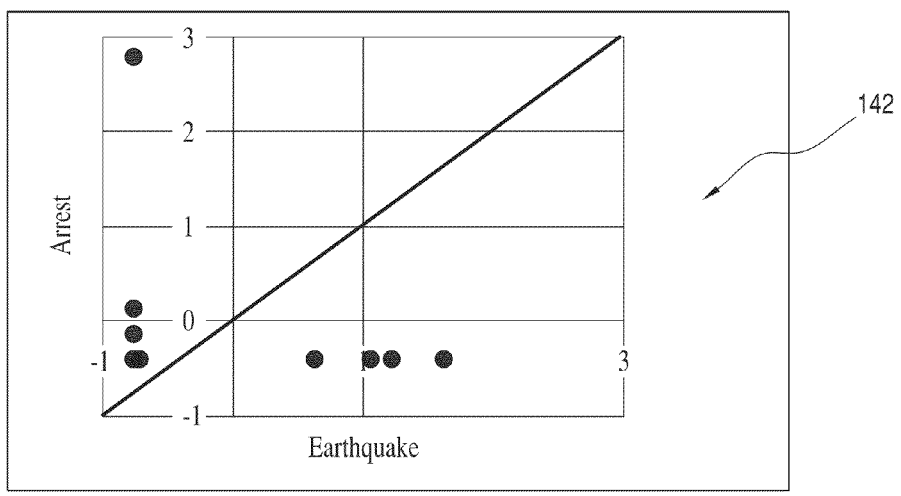
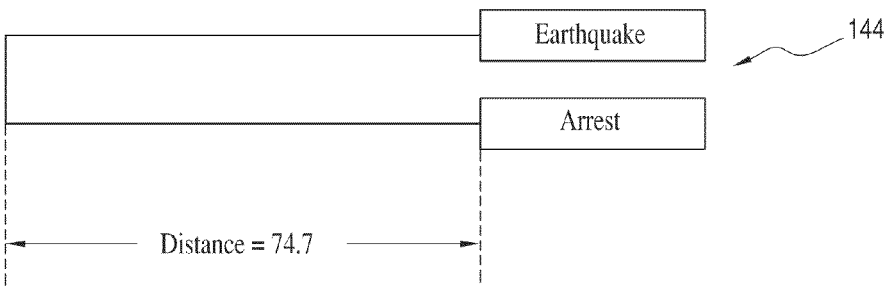

FIG. 15
| Event type | Histogram Counts | | | | | | | | | | Correlation | | |
|---|---|---|---|---|---|---|---|---|---|---|---|---|---|
| | | | | | | | | | | | Coefficient | Confidence | Distance |
| Earthquake | 600 | 460 | 12 | 500 | 350 | 0 | 0 | 0 | 0 | 0 | 0.13 | 67% | 70.6 |
| Public Property Damage | 120 | 30 | 12 | 30 | 50 | 0 | 10 | 20 | 200 | 50 | | | |
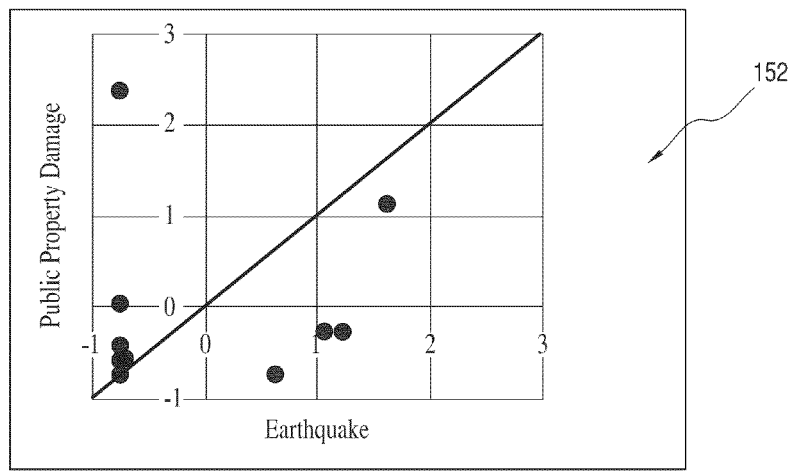
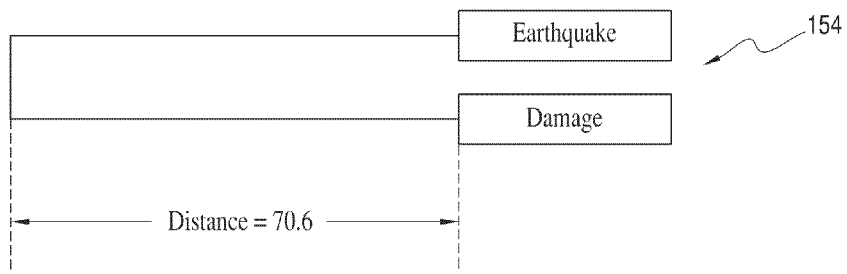

FIG. 16
| Event type | Histogram Counts | | | | | | | | | | Correlation | | |
|---|---|---|---|---|---|---|---|---|---|---|---|---|---|
| | | | | | | | | | | | Coefficient | Confidence | Distance |
| Earthquake | 600 | 460 | 12 | 500 | 350 | 0 | 0 | 0 | 0 | 0 | 0.83 | 100% | 8.8 |
| Public Property Damage | 120 | 30 | 12 | 30 | 50 | 0 | 0 | 0 | 0 | 0 | | | |
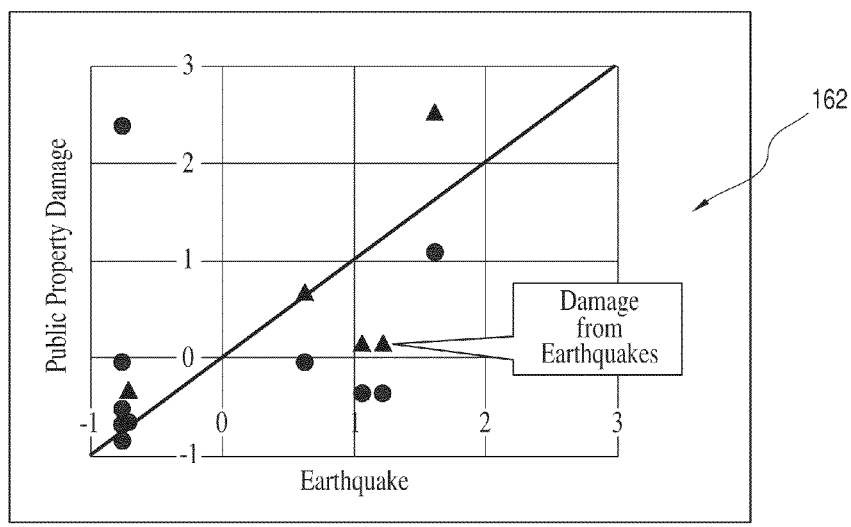
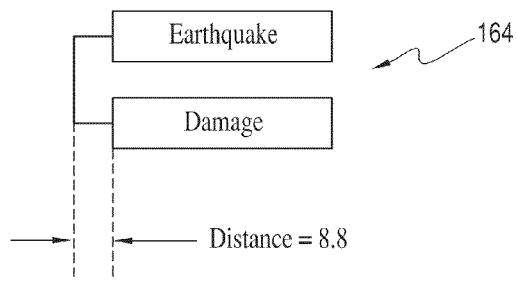

FIG. 17
| Event type | Histogram Counts | | | | | | | | | | Correlation | | |
|---|---|---|---|---|---|---|---|---|---|---|---|---|---|
| | | | | | | | | | | | Coefficient | Confidence | Distance |
| Riot | 0 | 0 | 0 | 0 | 0 | 0 | 20 | 20 | 250 | 30 | 0.99 | 100% | 0.5 |
| Public Property Damage | 0 | 0 | 0 | 0 | 0 | 0 | 10 | 20 | 200 | 50 | | | |
170
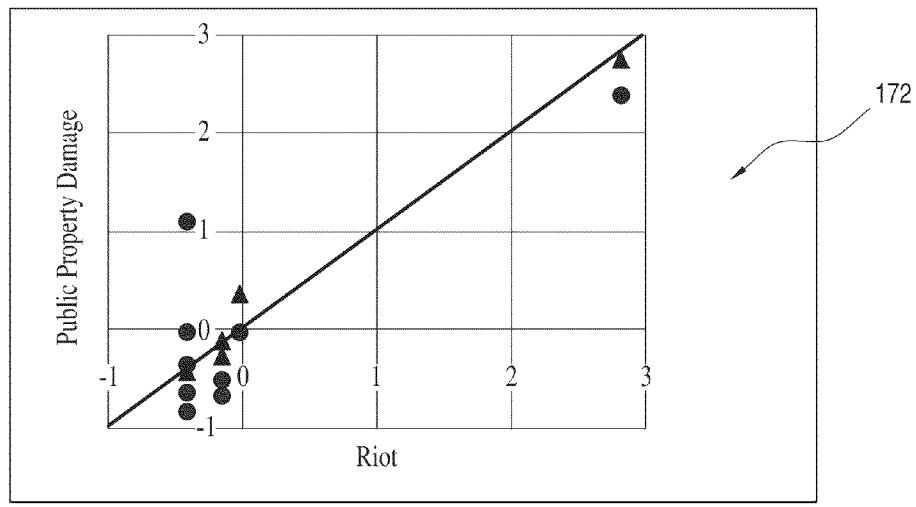
172
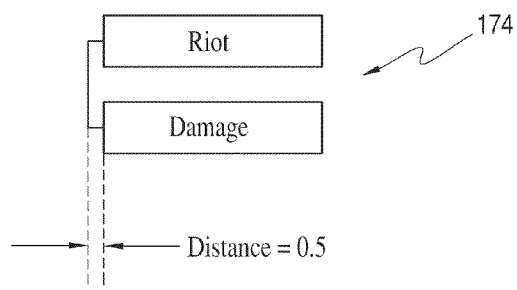
174
Distance = 0.5

| Realizations | | A | B | Events in At | | E |
|---|---|---|---|---|---|---|
| | | | | C | D | |
| $At^{(1)}$ | | 100 | 23 | 122 | | 54 |
| $At^{(2)}$ | | 200 | | 456 | 454 | |
| $At^{(3)}$ | | | 211 | 232 | 21 | 111 |

FIG. 22

SYSTEM AND METHOD FOR PREDICTING EVENTS

BACKGROUND

The human brain is capable of processing information about events and predicting other events that will result from the original event. For example, if a person sees a fragile object falling off of a table, the person can predict that the object will, if left alone, fall to the ground and be damaged. Similarly, if a catastrophe occurs, such as an earthquake, the human mind can predict that there will be damage to buildings and possibly the need for aid, such as shelter and food supplies. While this type of event prediction seems trivial, it is actually the result of the complex learning ability of the human mind and the ability to process data against causality rules learned from previous experience. This process of observing an event and reasoning about future events that may result from the observed event, known as "causal reasoning", is a very complex task that can be performed quickly on a small scale by the human brain.

Where the human mind is limited, as compared to digital computers, is in its ability to quickly process large volumes of data. For example, a person could not possibly digest the information in every newspaper, let alone the myriad of other information sources, such as television, web pages, social media, and the like. To date, event prediction has been limited by the ability of the human mind to process data and the inability of digital computers to correlate data and learn causality in a scalable manner.

In the paper entitled Learning Causality for News Events, the authors propose a system for predicting events by extracting causal relationships based on language cues such as: A "resulted in" B. Cause and event pairs are thus determined. Complex ontologies are required to develop the cause and event pairs. It is also known how to code event descriptions in various ways for processing. For example, Conflict and Media Event Observations (CAMEO) discloses an event framework coding scheme for studying mediation of international disputes.

It has been posited that significant societal events are somewhat predictable based on indicators in societies' communications, activities, and consumption prior to an event. For example, political unrest, social trends, population needs and the like could be predicted in advance. These indicators can be found in the vast amount of communications and activities that are documented in the online world. For example, news reports, social media communications, economic statistics and transactions are all recorded on the Internet and other sources. However, the volume of this data is enormous and most of the data is meaningless in the context of event prediction. As a result, there have been no real-time scalable algorithms for predicting events.

BRIEF DESCRIPTION OF THE DRAWINGS

FIG. 8 illustrates a data structure of a histogram.
FIG. 9 is a detailed view of histogram data.
FIG. 13 illustrates a distance calculation.
FIG. 14 illustrates a distance calculation.
FIG. 15 illustrates a distance calculation.
FIG. 16 illustrates a distance calculation.
FIG. 17 illustrates a distance calculation.
FIG. 22 is an example of realization counts.

DETAILED DESCRIPTION

Figure 1:
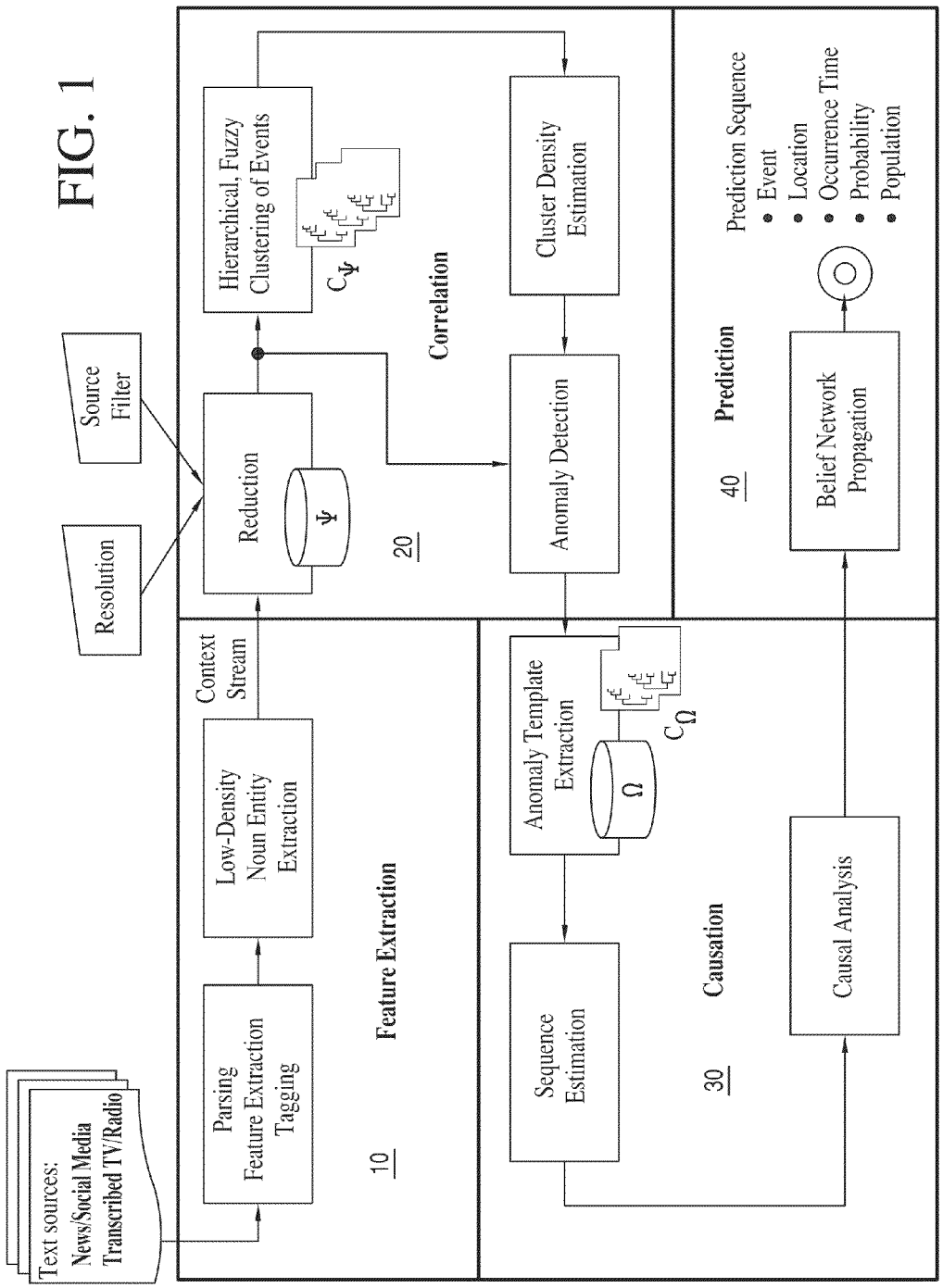
FIG. 1 is a schematic diagram of a system architecture of an embodiment.

The inventors have developed a system and method for continuously processing data streams, detecting significant events within the data streams, and predicting future events based on the detected significant events. The system and method is scalable and capable of operating in real-time. The described embodiments discover relationships between event types, populations, time, and locations using statistical methods in a manner that leverages relationships that have not been previously explored.

Recent discoveries using neuroimaging suggest that the human mind employs the same regions of the brain for memory and simulating future events. The Constructive Episodic Simulation Hypothesis suggests that the brain is a "prospective organ" that uses information from the past and present to generate simulations of future events. This hypothesis has been extended with an assertion that a predictive system preferably performs the following tasks:

1. Event Correlation: This task associates events in time, location and population. A natural disaster co-occurs in location and time with human death and population displacement.
2. Causation Reasoning: This task sorts events chronologically and reasons about causality. Because of the natural disaster, human death occurred; and had the natural disaster event not occurred, then the human death event would also not have occurred.
3. Future Event Prediction: This task matches one or more observed events to a stored sequence of events and uses it to predict what may happen next. Because it remembers the event of human death from the last natural disaster, the predictive system can conclude that after the next natural disaster, human death will likely follow.

In the disclosed embodiment, event information harvested from the data streams is transformed into an atomic message format. Attributes of the messages are mapped to feature dimensions in a multidimensional histogram. The histogram is queried to determine co-occurrence of event types, and correlated event types are clustered based on the corresponding event type attributes using a multiple assignment hierarchal clustering algorithm. A probability density function corresponding to multiple feature dimensions for each cluster of related event types is estimated. Significant events in the message stream are defined as the anomalous messages, detected by comparing feature dimensions of incoming messages to the probability density functions of the cluster corresponding to the event type of the incoming messages. Further highly anomalous event types are identified in clusters based on the probability density functions. Similar anomalous event type clusters are aggregated to create an anomaly template of multiple sets of events. A temporal sequence of each event type in the anomaly template is then established. Causal relationships between each set of event types in the anomaly template are estimated. A belief network of the sets of event types is constructed and applied to incoming events to predict future related events. Event types from the belief network are applied onto a timeline to establish a sequential set of event types related to the significant event type.

FIG. 1 is a schematic diagram of a system architecture of an embodiment. The architecture of FIG. 1 consists of general purpose computing devices including processors and memories storing data and instructions. The functions of the architecture are segregated into modules and sub-modules for ease of description. However, the individual modules need not represent discrete devices and/or discrete code. The architecture of FIG. 1 includes four modules, feature extraction module 10, correlation module 20, causation module 30, and prediction module 40.

Feature extraction module 10 receives data streams having information relating to events and processes the data streams to identify event data. For example, a crawler crawls web sites and other on-line sources, such as social media sources, news feeds, and the like to retrieve data in a known manner. Other sources of information could include web-based information APIs or transcriptions of audio, video and other non-textual data feeds. Feature Extraction module 10 identifies distinct events in the data stream, and then for each event identifies a number of related, significant attributes in the data associated with the event, such as locations, dates, and the like.

The output of the feature extraction module is a stream of "contexts", where each context can be represented by an event label (a.k.a event type), time interval, list of entities, locations, populations, and source information. Event labels are determined for the context by matching event words parsed from the data stream to a hierarchical event framework, such as the IDEA or other Typology. Populations are similarly coded to a hierarchical population framework like the TABARI Taxonomy. Additional fields, such as sentiment, can be included as modifiers of the event instance (e.g. "Reject Settlement" is modified by "Strong Resentment from the General Population").

A context, X, of the embodiment, is an atomic data element, based on a subject-verb-object paradigm extracted from one or more text expressions (clause, sentence or paragraph) in a form such as:

$$X=\{P'_{sub}, L'_{sub}, E', P'_{obj}, L'_{obj}, P'_{obj}, L'_{obj}, \{N\}, S', Dr, t_s, t_e\}$$

Where:
Subjective Population Label ($P'_{sub}$): Hierarchical Population Label of subject
Subjective Location Label ($L'_{sub}$): Hierarchical Location Label (Country, Province, City) of subject
Event Label (E'): Hierarchical Event Label
Objective Population Label ($P'_{obj}$): Hierarchical Population Label of object
Objective Location Label ($L'_{obj}$): Hierarchical Location Label (Country, Province, City) of subject
Low-Density Noun Set {N}: Collection of low-density nouns occurring within the expression
Source Label (S'): Hierarchical Label of Media Taxonomy (Type, Sub-Type, Media Name)
Sentiment Label (St): Label associated with the effect of the language in the context (Fear, Anxiety, Anger, etc.) (Optional)
Document Reference (Dr): Unique ID of source document (hyperlink, number, etc.)
Timestamp of Event (t): Time stamp estimate of the event (not publication time stamp)

A valid context, X, can be represented by an Event label E', an estimated event start and end time ($t_s$, $t_e$), a source label S', an Entity List {N}, and a document reference (Dr). The context may also contain optional population P' and location L' indicators for both subjective (doer) and objective (receiver) noun entities of the expression (e.g. $P_{sub}'$=Government, $L_{sub}'$=USA, E'=Provide Aid, $P_{obj}'$=General Population, $L_{obj}'$=Haiti). Additional features, such as sentiment, can be introduced as event modifiers. Variables P', E', L' and S' are hierarchical variables, that is, they can be represented at multiple resolution levels. The lowest resolution is the root node (e.g.$P'^0$) in the variable's hierarchy structure. Each lower level in the variable's hierarchy structure (e.g. $P'^1$, $P'^2$) subdivides its parent into at least two more specific representations of the parent.

An example of information related to an event is set forth below:
"President Obama, speaking from the Oval Office, pledged his country's full support to the people of Haiti following the powerful earthquake that struck the poor nation"

An example of a context X extracted from the event information is set forth below:
X={, National Executive Leader, Washington, D.C., USA, Promise Humanitarian Aid, Natural Disaster Victims, Haiti, {Obama, earthquake, poor}, Internet News Media, http://www.washingtonpost.com/[ . . . ], Jan. 15, 2010}

Contexts can be processed to predict a sequential set of events related to a significant event. Events are associated in time, location and population. For example, a natural disaster often co-occurs in location and time with human death and population displacement. Events are sorted chronologically and reasons about causality are implied. For example, because of the natural disaster, human death occurred; and had the natural disaster event not occurred, then the human death event would also not have occurred. One or more observed events can be matched to a stored sequence of events and used to predict what may happen next. Continuing with the example, because it remembers the event of human death from the last natural disaster, the predictive system can conclude that after the next natural disaster, human death will likely follow. This operation is described in greater detail below.

Correlation module 20 automatically groups event contexts by their feature dimensions, such as time, location, event type and population and identifies when a grouping is undergoing a large amount of change. As described in greater detail below. This is accomplished in part by clustering correlated event types and using cluster density estimates to detect anomalous activity. If a significant change has been detected in an event type within a cluster, that entire cluster can be classified as anomalous. Anomalous clusters, or Event Type clusters with one or more anomalous event types, are used to form and update persistent models of event type relationships, called "anomaly templates". Anomaly templates provide the input for causation module 30 and prediction module 40.

Figure 2:
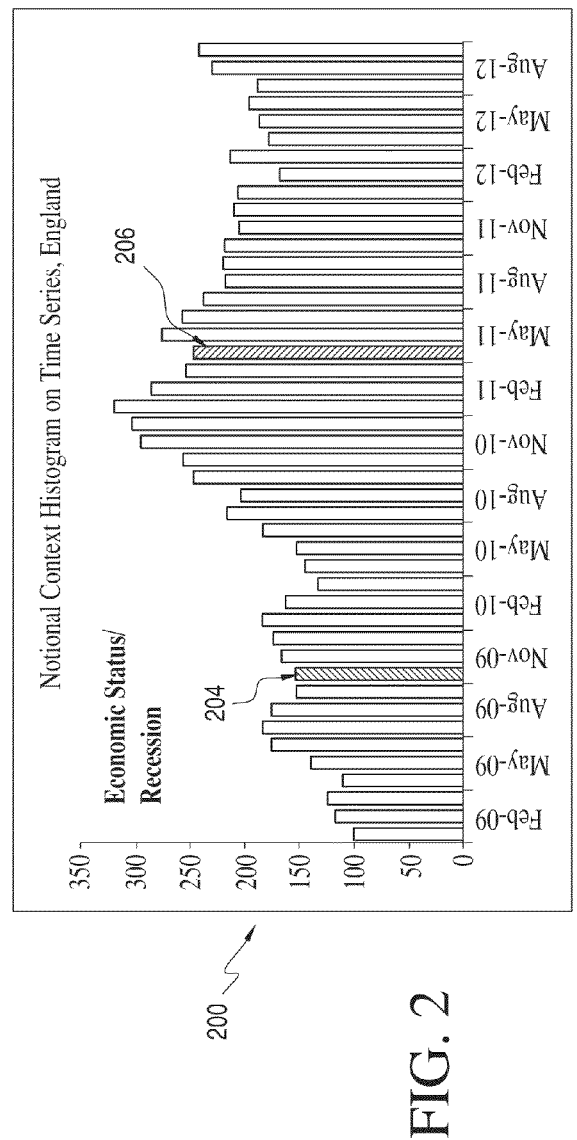
FIG. 2 illustrates event context data structures.

The embodiment can be used for any type of events in any location and on any population. The following example deals with a natural disaster in Haiti and Economic events in the UK. FIG. 2 illustrates the data structures 200 of two example event contexts, Context 1 and Context 2. It can be seen that these contexts relate to economic events in England. At 202, event contexts having the event type ECONOMIC STATUS/RECESSION and location of ENGLAND have been grouped by time and graphed. The y-axis of graph 202 shows notional context counts and the x-axis is time. The date ranges in the graph corresponding to Context 1 and Context 2 are indicated at 204 and 206 respectively.

Figure 3:
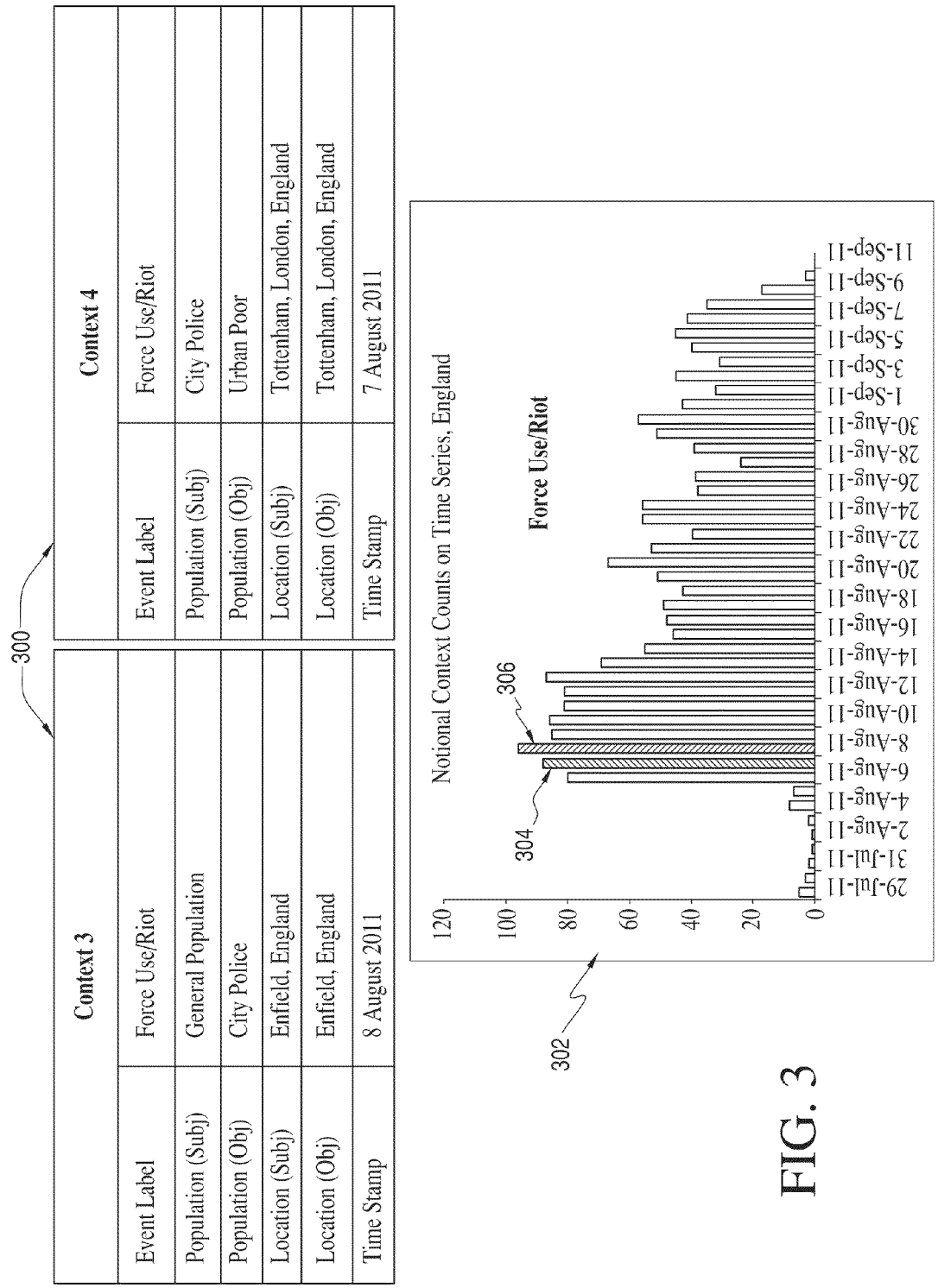
FIG. 3 illustrates event context data structures.

FIG. 3 illustrates the data structures 300 of two additional event contexts, Context 3 and Context 4. It can be seen that these contexts also relate to events in England. At 302, event contexts having the semantic label FORCE USE/RIOT and location of ENGLAND have been grouped by time and graphed. The y-axis of graph 302 shows notional context counts and the x-axis is time. The date ranges in the graph for Context 3 and Context 4 are indicated at 304 and 306 respectively.

Figure 4:
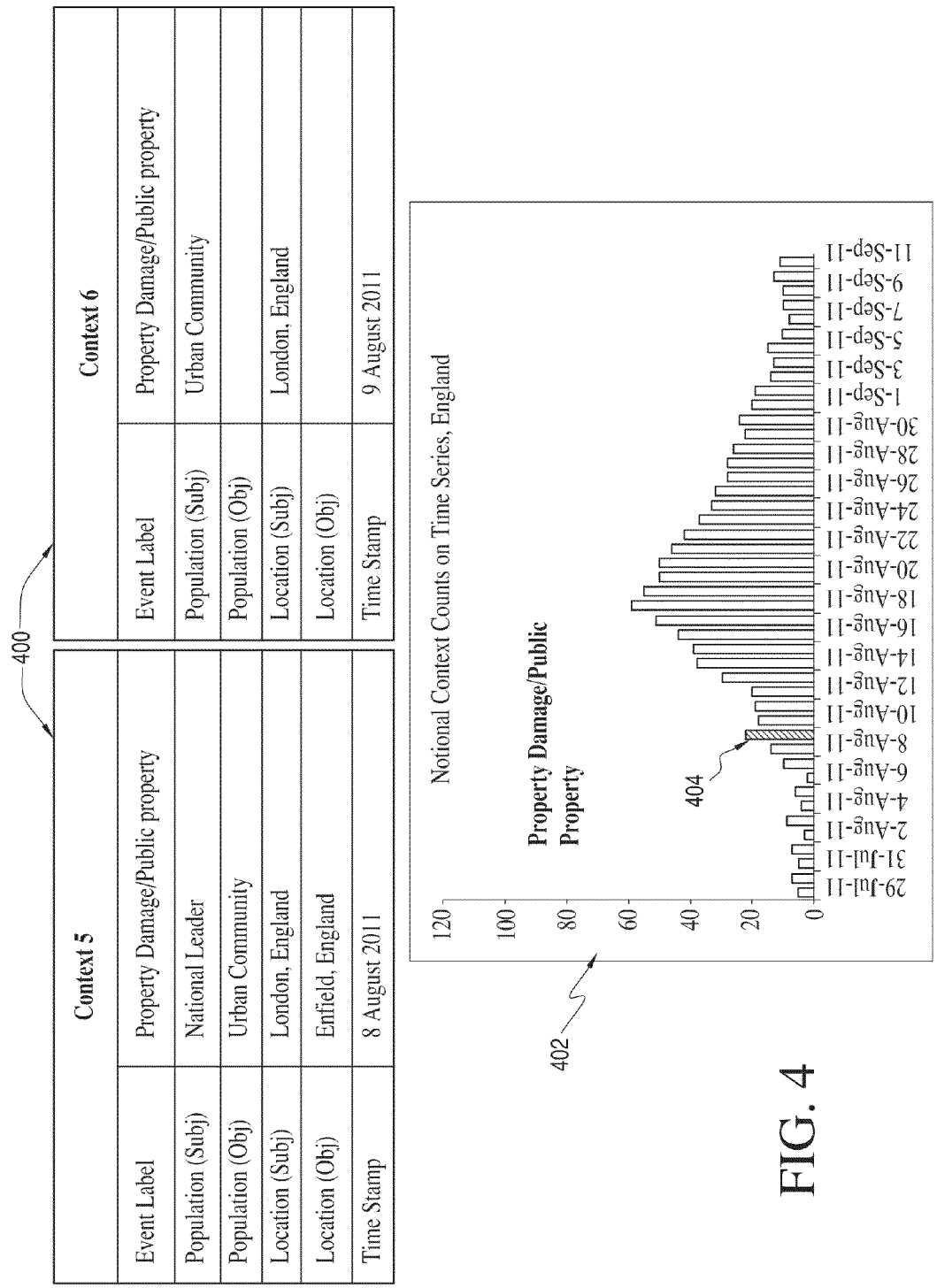
FIG. 4 illustrates event context data structures.

FIG. 4 illustrates the data structures 400 of two additional event contexts, Context 5 and Context 6. It can be seen that these contexts also relate to events in England. At 402, event contexts having the semantic label PROPERTY DAMAGE/PUBLIC PROPERTY and location of ENGLAND have been grouped by time and graphed. The y-axis of FIG. 4 shows notional context counts and the x-axis is time. The date range in the graph for Context 5 and Context 6 are indicated at 404.

Figure 5:
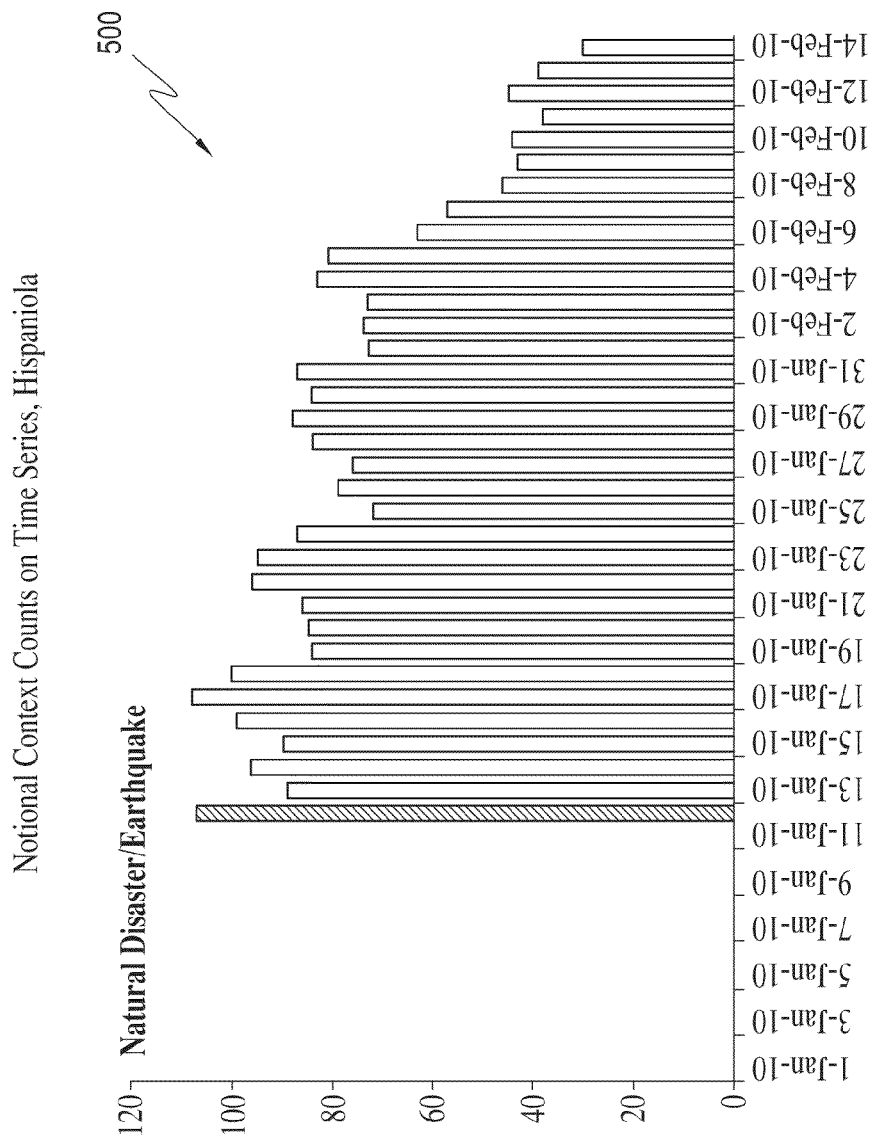
FIG. 5 is a graph of event contexts.

FIG. 5 illustrates graph 500 of event contexts having the semantic label NATURAL DISASTER/EARTHQUAKE and a location of HAITI. Again, the events have been grouped by time and graphed. The y-axis of FIG. 5 show notional context counts and the x-axis is time.

Figure 6:
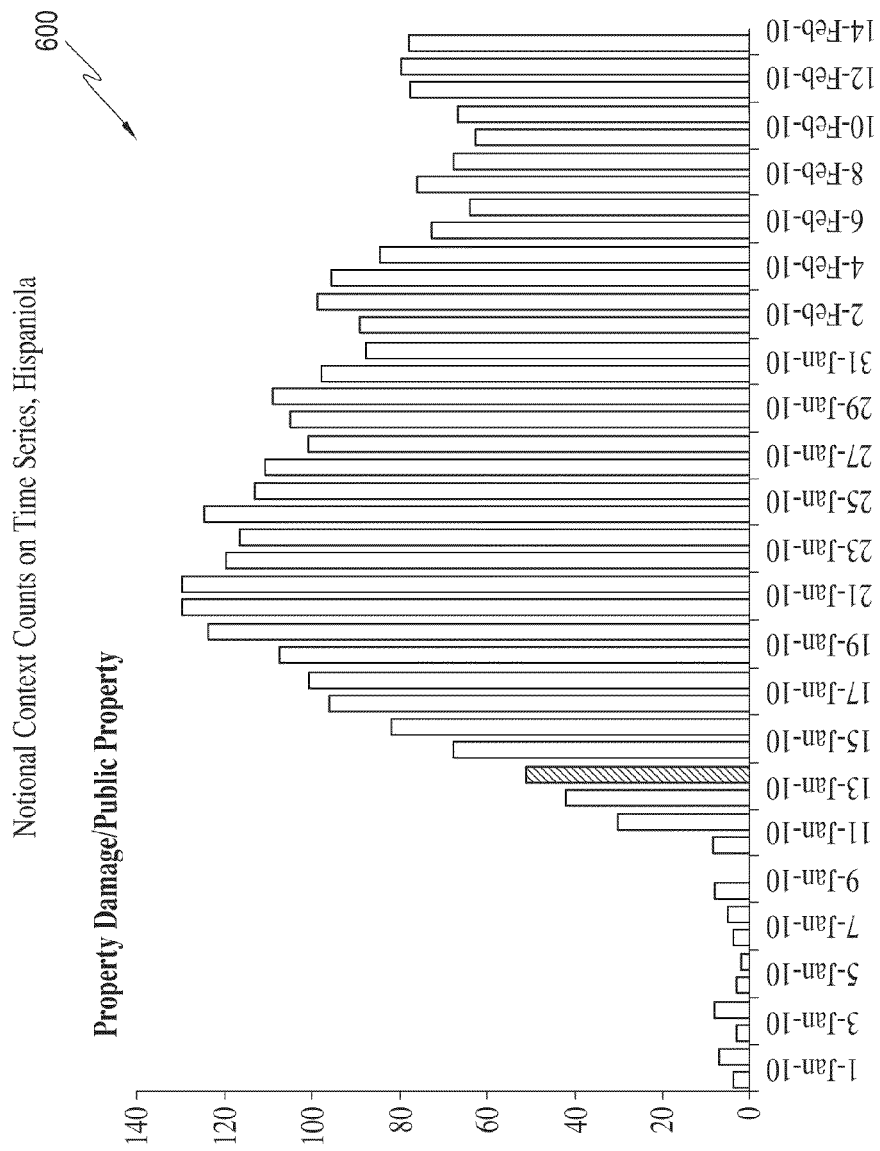
FIG. 6 is a graph of event contexts.
Figure 7:
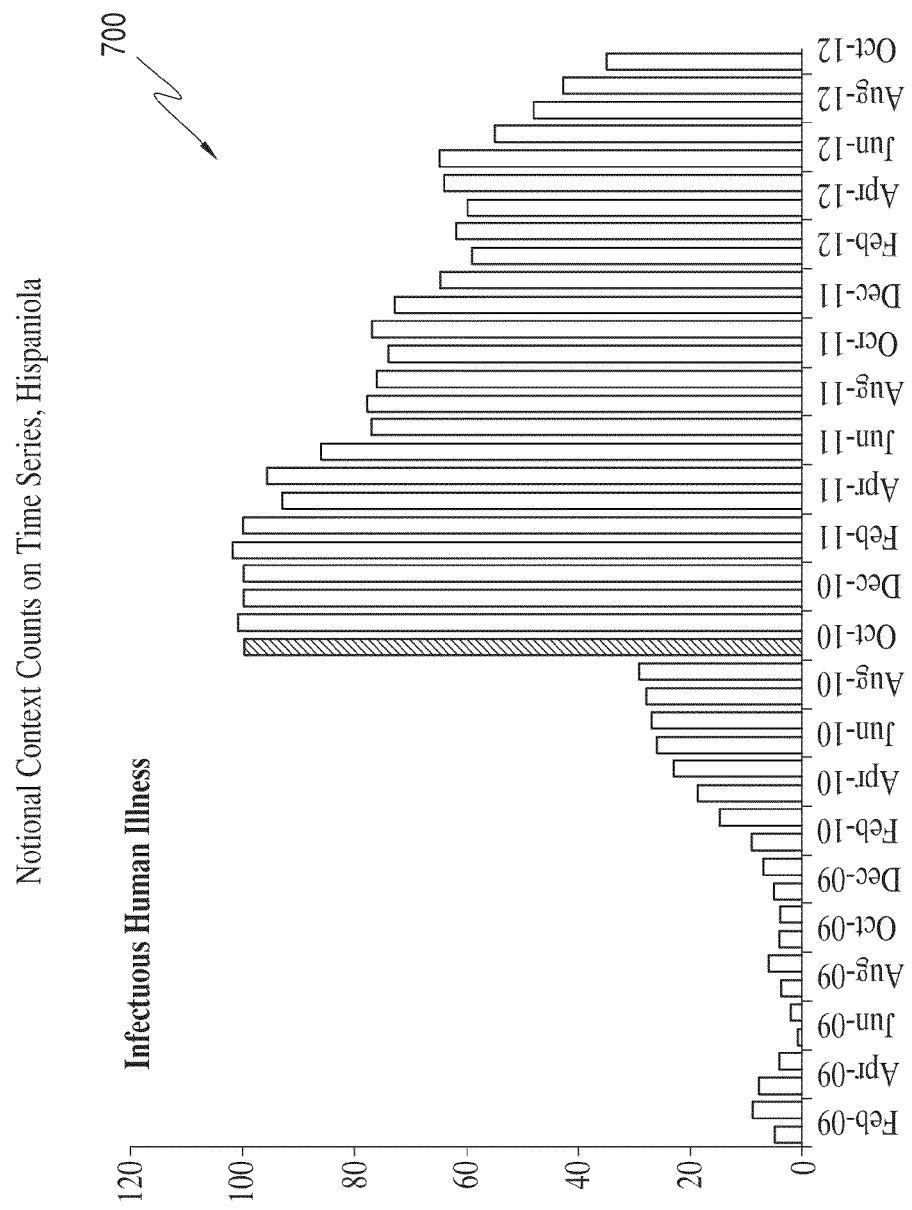
FIG. 7 is a graph of event contexts.

FIG. 6 shows graph 600 of event contexts for PROPERTY DAMAGE/PUBLIC PROPERTY in Haiti. Similarly, FIG. 7 shows graph 700 of event contexts for INFECTIOUS HUMAN ILLNESS.

Correlation module 20 of FIG. 1 uses a multidimensional histogram to enable clustering of event types based on feature co-occurrence. Data attributes in the contexts are binned to a feature dimension in a dynamic multidimensional histogram, where the values of the attributes uniquely identify each context's N-dimensional coordinate. Some dimensions, such as event type and location, are unordered and categorical, while others, such as the start and end times ($t_s$, $t_e$), are assigned to an ordered time axis. There are eight orthogonal dimensions D in the multidimensional histogram of the embodiment, $$\{D_t, D_E, D_{Lsub}; , D_{Lobj}, D_{Psub}, D_{Pobj}, D_S, D_N, D_{SO}\}$$

Where:
$D_t$ =Time: Sequential, Numeric
$D_E$=Event Type: Unordered, Categorical, Hierarchical
$D_{Lsub}$/$D_{Lobj}$=Objective/Subjective Location: Ordered, Categorical, Hierarchical
$D_{psub}$/$D_{Pobj}$=Objective/Subjective Populations: Unordered, Categorical, Hierarchical
$D_N$=Noun Entities: Unordered, Categorical, Range
$D_S$=Sentiment: Unordered, Categorical, Optional
$D_{SO}$=Source: Unordered, Categorical, Hierarchical, Optional A simplified example of a multidimensional histogram is the 2-dimensional histogram 800 illustrated in FIG. 8. The histogram maps the dimensions of the event contexts, such as those illustrated in FIGS. 5, 6, and 7 into a table. Of course, this example is greatly simplified and actual histograms can have many more contexts and many more dimensions. The histogram bins associated with the time dimension, $D_t$, are by date in this example and the number of bins is determined by a specified sliding window. Each context produces a count in each bin bounded by the interval defined by each context's start and stop times, i.e. the beginning and end of the day in this case. The event type dimension, $D_E$, is an unordered dimension of all lowest-level/highest-resolution events defined by the embodiment's event typology (e.g. Property Damage is represented by its two child bins in the histogram: Public Property Damage and Private Property Damage). $D_{Lsub}$ and $D_{Lobj}$ are dimensions associated with the subject's (doer's) location and object's (receiver's) location label, respectively. In the case of Natural Disaster, these locations are the same. Within a dimension, there may be multiple resolutions of a location hierarchy represented. For example, Port-Au-Prince, Saint Marc, and Port-de-Paix are all included in the histogram as sub-locations of Haiti.

In the simple example of FIG. 8, population, source and entity dimensions are not shown. However, similar to the location dimension, population would be represented as subjective and objective populations ($D_{Psub}$, $D_{Pobj}$) in a more complex example. The population dimensions may also represent multiple levels of hierarchy (e.g. International Dissident, Terrorists, and Haqqani). Tables for location and population that define embedded classes (e.g. Haqqani is a subclass of Terrorists and Terrorists is a subclass of International Dissident, etc.) are available to accurately aggregate counts in these dimensions. The source dimension represents the context's source media name (e.g. Elle Decoracion, Critica de la Argentina, Twitter, CNN, etc.). Finally, the entity dimension {N} is the collection of all entities extracted from the original expression.

The multidimensional histogram enables range aggregation queries that can generate context counts from predicate statements of the form, $$(D_1 \subseteq \{a_1, a_2 \dots\}) \wedge \dots \wedge (D_2 \subseteq \{b_1, b_2 \dots\})$$

where $D_1$, $D_2$, etc. represent orthogonal feature dimensions defined by a subset of attributes $a_1$, $b_1$, etc.

One or more dimensions may be marginalized implicitly by excluding the dimension entirely from the histogram query. By having an efficient means to compute counts and geometrically estimate density functions, queries can be used to compute any form of conditional probabilities. For example, to estimate the probability of a Cholera outbreak event, given an Earthquake, P(Cholera|Earthquake $\vee$, ..., $\vee$ Damage to Water Supply), we can divide the counts from all related Contexts that included Cholera ($D_E \subseteq$ {Cholera$\wedge$ Earthquake $\vee$, ... $\vee$ Damage to Water Supply)}) by the counts returned from all Cholera outbreaks $D_E \subseteq$ {War $\vee$, ... $\vee$ Damage to Water Supply}).

The histogram can be stored in temporary storage, such as a computer hard disc or solid state memory. This provides fast computation of event type occurrence/count vectors. Each feature dimension in the context is assigned to a 'bin' or address defined uniquely by the values of the context. Every context can be maintained in memory until it becomes stale and is expunged. For example, a predetermined time window can be used to determine how long a context is retained. Given any event type, the histogram returns a counts vector where each element in the vector is the number of context counts.

Figure 10:
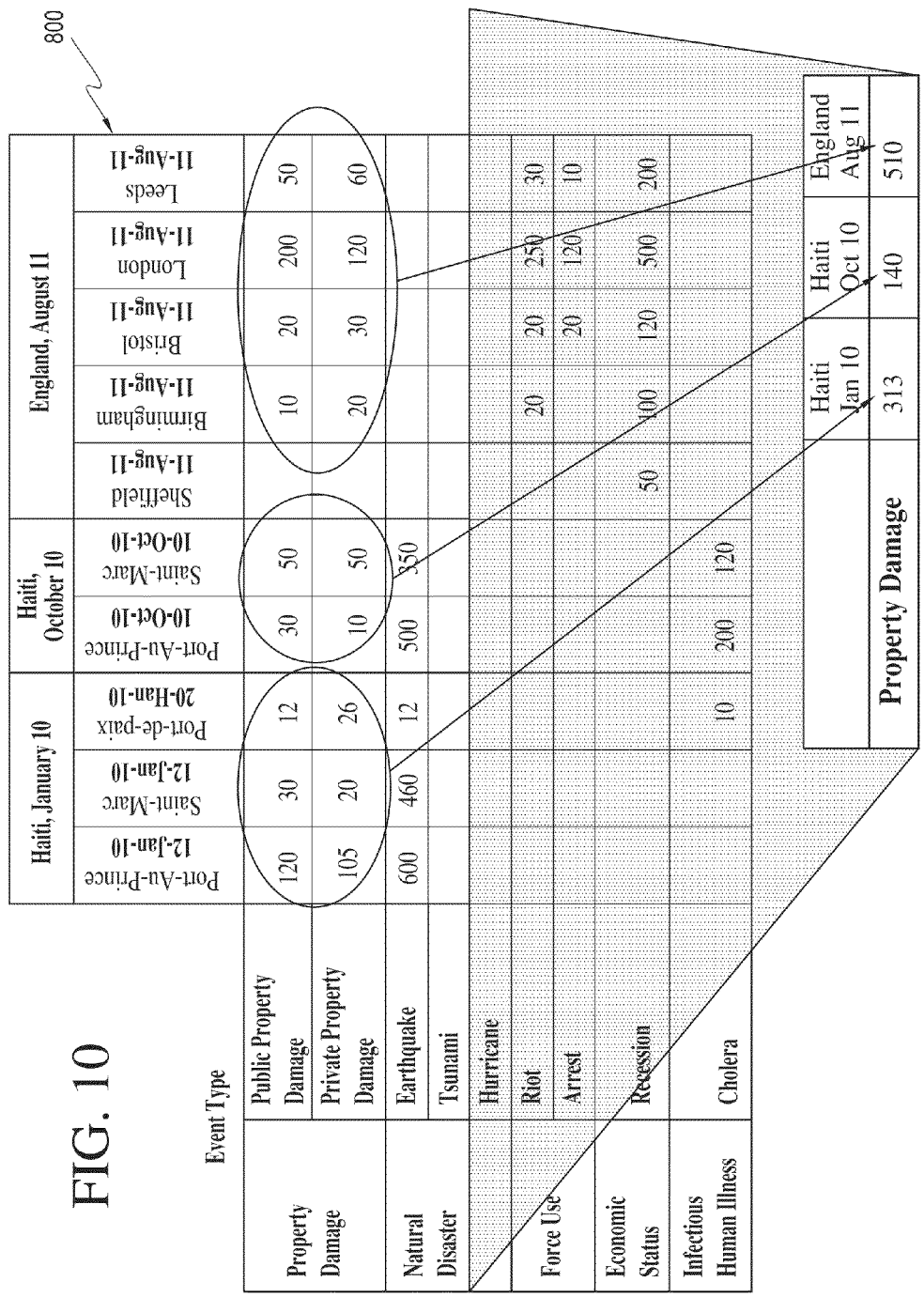
FIG. 10 is a detailed view of histogram data.

To achieve sufficient counts, the embodiment uses some novel techniques. Context counts are aggregated across a feature dimension (e.g. PUBLIC PROPERTY DAMAGE). FIG. 9, which shows the data of the histogram 800 of FIG. 8 in greater detail, illustrates how the event type counts for STATE-OWNED, LOCAL GOVERNMENT, RELIGIOUS, and POLICE are summed to achieve a value in the histogram of FIG. 8 for PUBLIC PROPERTY DAMAGE, regardless of affected population. Second, context counts can be converged or aggregated within a hierarchical dimension, tuning precision (e.g. adding counts for Sheffield, London, Leeds, etc. to obtain a combined count for England). As shown in FIG. 10, all counts for each country can be summed.

Correlation module 20 of the embodiment automatically groups, or "clusters", closely related instances of event types. This is accomplished using context co-occurrence analysis with the event type dimension selected as the cluster "target" variable. In other words, if two event types exhibit a significant co-occurrence across the feature dimensions, then the two event types are related, i.e., "correlated". The embodiment clusters event types based on correlation in population, location, time, and entities (feature dimensions: $D_{Psub}$, $D_{Pobj}$, $D_{Lsub}$, $D_{Lobj}$, $D_N$, and $D_t$). Other dimensions could also be used, such as $D_S$. Since it is not known a priori how many groupings or clusters of co-occurring events exist within the domain of the multidimensional histogram, non-hierarchical methods, such as the k-means or k-medoid clustering approaches, cannot be used effectively.

Figure 11:
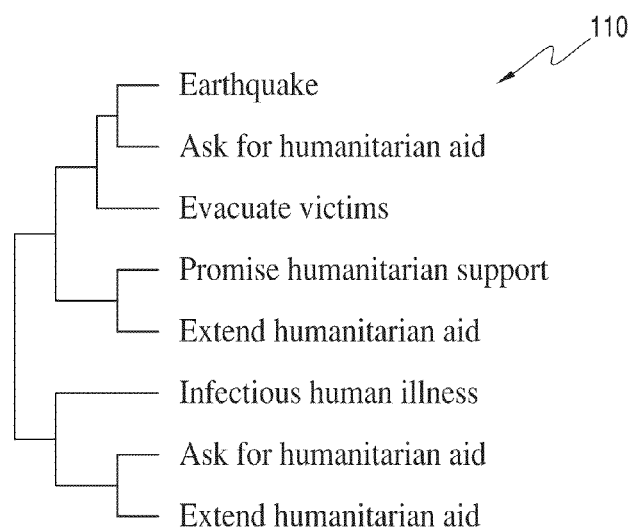
FIG. 11 is an event type dendrogram.

However, hierarchical clustering algorithms provide an effective alternative when the exact number of clusters cannot be specified in advance. The embodiment uses agglomerative hierarchical clustering algorithms to form dendograms by starting with singleton clusters and iteratively linking the "closest" pair of clusters until a termination condition has been achieved. Other hierarchical clustering approaches can be used as an alternative to agglomerative. An example dendrogram 110 of event types is shown in FIG. 11. The proximity between the event types within the graph 110 represent a measure of similarity between one event type and another event type. Note that event types EXTEND HUMANITARIAN AID and ASK FOR HUMANITARIAN AID are inserted twice in the clustering hierarchy of dendrogram 110 to represent multiple realizations of these event types.

The embodiment uses a distance function to compute the measure of similarity between event types. The distance function is based on the Pearson Product-Moment correlation coefficient of feature vectors for event types x and y, $r_{xy}$, which is computed from the co-occurrence counts provided by the multidimensional histogram. Correlation is a suitable measure of association when dealing with features across multiple unordered dimensions. Instead of using $r_{xy}$ directly, however, the embodiment uses $r_{xy}^2$ (called the coefficient of determination) since it can be interpreted as a proportion ($r_{xy}^2 = 0.4$ is twice the correlation of $r_{xy}^2 = 0.2$), and a geometric density estimate of $r_{xy}^2$ can be constructed A confidence-based distance function is defined for clustering, where positive correlation has a smaller distance than negative correlation:

$$dist(X,Y) = 1 - P[(r_{xy})^2].$$

The clustering process of correlation module 20 terminates when the confidence statistic obtained by the density estimate falls below a designated threshold ($P[(r_{xy})^2] < \phi$, where the confidence $\phi = 0.9$, 0.95, etc.). This one-dimensional, confidence-based distance function is extended to work with all feature dimensions of the histogram. Each dimension can be treated independently:

$$dist(X,Y) = 1 - \min_{\forall D} P_D[r_{xy}^2].$$

By taking the minimum confidence value across all clustering dimensions $D_1$, each dimension can be correlated at or above the confidence threshold. In other words, to correlate two event types, they must have contexts that exhibit co-occurrence in time, location, population and entities.

The cluster representative of the embodiment is defined as follows: the two elements with the highest confidence $r_{xy}^2$ are merged by summing the counts for the feature bin from both children. For example, suppose we have chosen to combine the two closest event types of dendogram 110 of FIG. 11 Ask for Humanitarian Aid={21,0,0,0,0,12,88,0,0,0,0,0} and Extend Humanitarian Aid={0,0,0,0,0,21,36,0,0,0,32,0}. The cluster representative (cluster center) is the vector sum of the two events: {21,0,0,0,0,33,124,0,0,0,32,0}. This new feature vector is used to represent the union of the two events in the subsequent clustering iterations.

Numerous instances of a particular event type may be occurring simultaneously within the designated countries (and even within the cities or provinces themselves) and these instances may not be related to each other (e.g., unrelated concurrent instances of Private Transactions in Brasilia and Lima). Therefore, we need to introduce a method to assign event types to multiple clusters.

Figure 12:
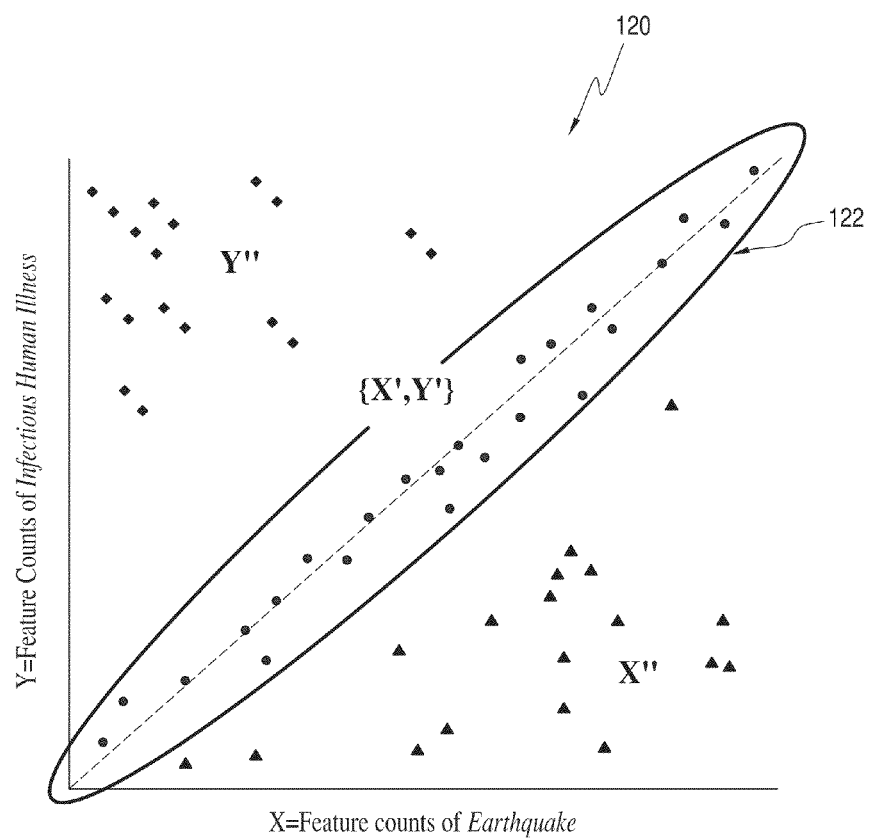
FIG. 12 is a graph of event co-occurrence.

The embodiment applies a novel approach of de-correlation and inhibition to enable multiple assignment correlation clustering. Consider how two event types such as Infectious Human Illness and Earthquake might correlate with each other. FIG. 12 illustrates graph 120 used for decorrelation and inhibition. Each axis of the graph represents co-occurrence counts of one or more feature dimensions. Dots 122 near the diagonal indicate context features that share counts with Earthquake and Infectious Human Illness. In the lower right portion of the plot, triangles (X") show features referring strongly to Earthquake, but not to Infectious Human Illness; and the diamonds (Y") are counts with strong reference to Infectious Human Illness but not to Earthquake. The plot of graph 120 indicates the features that are clustered together indicating the correlation of Earthquakes and Infectious Human Illness. The process of de-correlation and inhibition clusters only those feature counts that exhibit high correlation on a point-by-point basis (X', Y'). The features that exhibit low correlation (X", Y") are reprocessed for correlation with other events.

The process selects only those features that have an equivalent proportion of feature counts in both event types (i.e. the associative features). For example, if the feature dimension is location, then it represents those locations where both earthquake and illness occurred. The non-associative regions, marked X" and Y", suggest that there were other scenarios where one event type occurred without the other. The objective of decorrelation and inhibition is to only cluster associative features {X', Y'} and allow the non-associative features X" and Y" to cluster with other event types. The Pearson Product-Moment correlation can be interpreted as the average (moment) of the products of each element $x_i$'s and $y_i$'s z-score (also commonly referred to as standard score in statistics) in feature vectors X and Y:

$$r_{xy} = \frac{\sum_{i=1}^{n} z_{x,i} \cdot z_{y,i}}{n-1}$$

where:

$$z_{x,i} = \frac{x_i - \mu_x}{\sigma_x}$$

If the ith z-score product $z_{xi} z_{yi}$ is large, the ith element is associative because it increases the overall correlation. Conversely, if the ith z-score product is near zero, or negative, then the ith element is non-associative. If the z-product is negative, the ith element is disassociative. Using this interpretation, de-correlation and inhibition splits the elements of feature vectors X and Y into associative elements (X', Y') and non-associative elements (X", Y"). The associative elements are merged, and the non-associative elements are added back to the pool as singleton clusters for clustering in subsequent iterations.

The clustering approach of the embodiment described above is further detailed below in algorithm form. Event-labeled contexts are received. Initially, the contexts are aggregated in a multi-dimensional histogram by event type. An empty set S of all clusters is defined. Every event type E' is assigned to its own Singleton Cluster C(E') in S. A geometric density estimate θ is computed of the coefficient of determination $r_{xy}^2$ for all cluster pairs.

A continuous loop begins with selecting the closest event type pair X,Y from S using Θ, l=dist(X,Y,Θ). If l<φ, minimum confidence threshold of |S|=1, then break from the loop. The step of [X', Y', X", Y"]←decorrelateAndInhibit(X, Y) is carried out. The function X←merge(X',Y'); Y←∅ is carried out. If informationCriteria(X")=true, S←S∩C(X") (repeat for Y"). For each event type in cluster C and each C in set S, fuzzy membership statisites are computed. Finally, the hierarchal dendogram is constructed.

Putting it all together, the proposed hierarchical event type clustering algorithm can be summarized as follows:

1. Initialization: Given event-labeled Contexts in multidimensional histogram, confidence threshold, φ
   a. Aggregate all Contexts {X} in multidimensional histogram by Event Type
   b. Define empty set, S, the set of all clusters: s ← ∅
   c. Assign every Event Type E' to its own singleton cluster C(E') in S
   d. Compute Θ as the geometric density estimate of the coefficient of determination $r^2$ for all Cluster pairs in S
2. Continuously Loop:
   a. Select closest Event Pair, X, Y from S using Θ, θ = dist(X,Y,Θ)
   b. θ < φ, minimum confidence threshold or |S|=1, break from loop
   c. [X',Y',X",Y"] ← decorrelateAndInhibit(X,Y)
   d. X ← merge(X',Y'); Y ← ∅
   e. If informationCriteria(X") = true, S ← S ∪ C(X") (repeat for Y")
   f. Update geometric confidence density estimate Θ on S
3. For each event type in C and each C in S, compute Fuzzy membership statistic
4. Construct the hierarchical dendrogram FIG. 13 illustrates an example distance calculation of correlation module 20 between the event types of Arrest and Riot. The counts of the event types Arrest and Riot are entered in table 130. The Correlation Coefficient, Confidence, and Distance are calculated in the manner described above, for example. A scatterplot of the z-scores of the event types instances is shown at 132. It can be seen that, with a Correlation Coefficient of 0.99, and a Confidence of 100%, there is, not surprisingly, a strong association between the Riot and Arrest with a Distance of 0.4.

FIG. 14 illustrates a distance calculation between the Event Types of Earthquake and Arrest. The event types are entered in table 140. The Correlation Coefficient, Confidence, and Distance are calculated in the manner described above, for example. A graph of the event types is shown at 142. It can be seen that, with a Distance of 74.7, there is a weak anti-correlation between the event types Earthquake and Arrest, as shown graphically at 144.

FIG. 15 illustrates a distance calculation between the event types of Earthquake and Public Property Damage. The counts of the event types are entered in table 150. The Correlation Coefficient, Confidence, and Distance are calculated in the manner described above, for example. A scatterplot of the z-scores of event type instances is shown at 152. It can be seen that, with a Distance of 70.6, there is little correlation between the event types Earthquake and Public Property Damage at 154. In other words, while Earthquakes often cause damage, damage is also caused from other events, such as riots in this example. This indicates that the event type Damage should be split into two separate event types, Damage From Earthquake and Damage From Riots in order to have clusters with high correlation.

Figure 27:
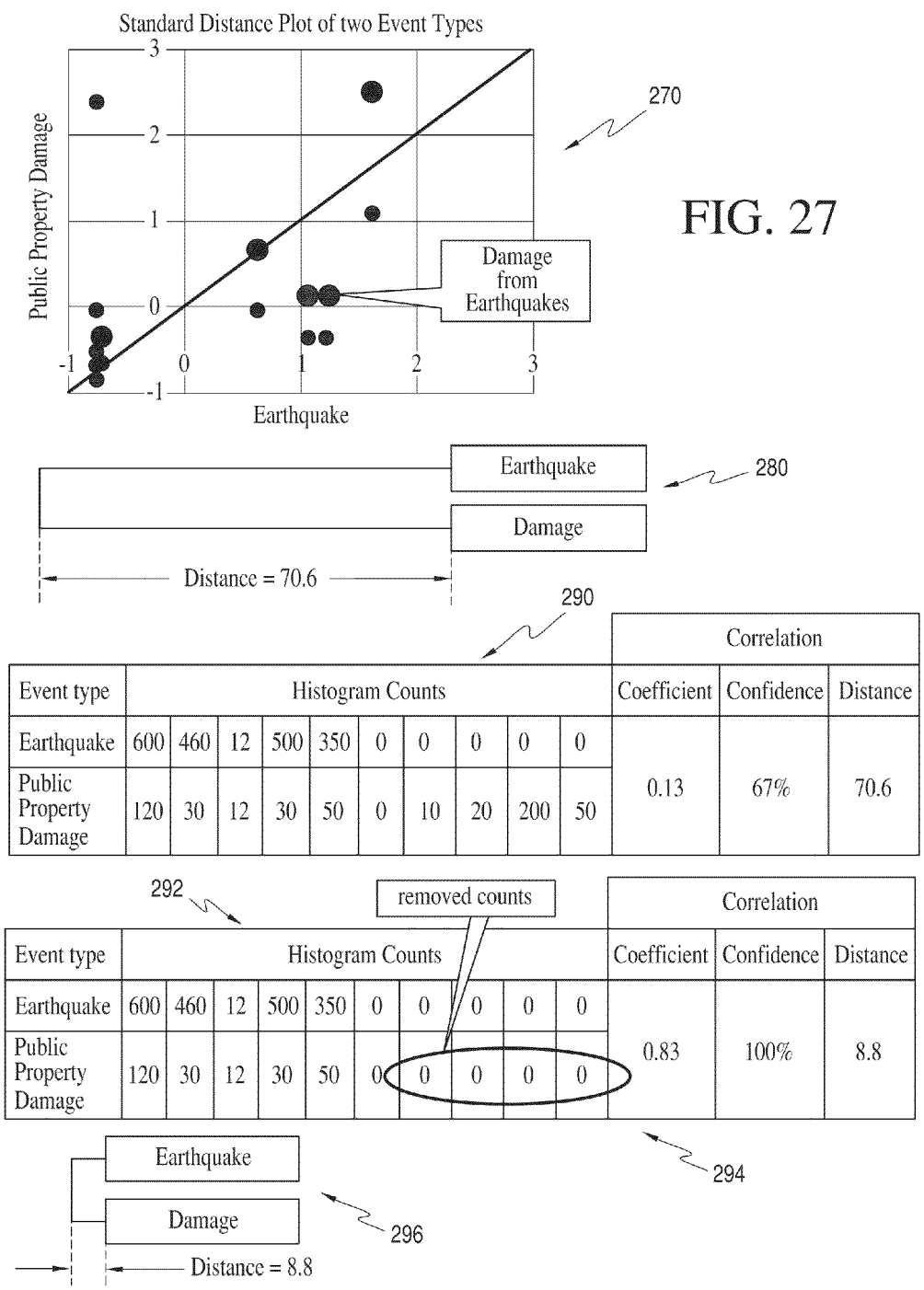
FIG. 27 illustrates a distance calculation and the effect of decorrelation.

FIG. 27 illustrates the decorrelation and inhibition steps that help assign an event type to different event clusters by comparing distances between event types based on correlation. In scatterplot 270 of the standard distances (z-scores), there are data points that associate Damage with Earthquake and Damage with Riot. By taking in all the counts from Damage, we have a weak correlation between Earthquake and Damage (r=0.33, @67% and a distance of 70.6) as indicated at 280. The counts associated with Damage from the Riot, and Damage from Earthquake are shown in table 290. By applying the method of decorrelation and inhibition described above, the Damage counts associated with the Riot can be removed and replaced with zeros, as shown graph 292. By splitting the counts into two vectors, one for Damage from Earthquakes and one for Damage from Riot, the correlation is increased and the distance is decreased. The correlation can be recomputed using these points and the correlation jumps to a much higher value. i.e the distance is much lower, as shown at 294 and 296.

FIG. 16 illustrates a distance calculation between the new event types of Earthquake and Damage. The counts of the event types are entered in table 160. The Correlation Coefficient, Confidence, and Distance are calculated in the manner described above, for example. A scatterplot of the z-scores of the event type instances is shown at 162. Of course, it can be seen that, with a Distance of 8.8, there is a strong correlation between the event types. Similarly, FIG. 17 illustrates a distance calculation between the new event types of Riot and Damage from Riot. The counts of the event types are entered in table 170. The Correlation Coefficient, Confidence, and Distance are calculated in the manner described above, for example. A graph of the event types is shown at 172. Of course, it can be seen that, with a Distance of 0.5, there is a very strong correlation between the event types as shown at 174.

With highly correlated clusters, "usual" behavior can be determined by using the histogram to estimate a probability density function (PDF) for each cluster. As described above, given a clustering C of event type instances, the histogram will return a cluster-specific density estimate for all feature dimensions limited to the members within the cluster itself. A cluster's PDF provides a mechanism for detecting anomalous (and therefore significant) contexts from the incoming context stream for each cluster.

Assuming that the cluster distribution is pseudo-stationary and pseudo-ergodic within the time window spanned by the underlying contexts supporting the cluster relationship, i.e. a small proportion of context samples compared with the density estimate are drawn from a significantly different distribution than the distribution estimated by the histogram, and that all instances that are related must also be correlated: there are no dependent and uncorrelated instances.

Figure 18:
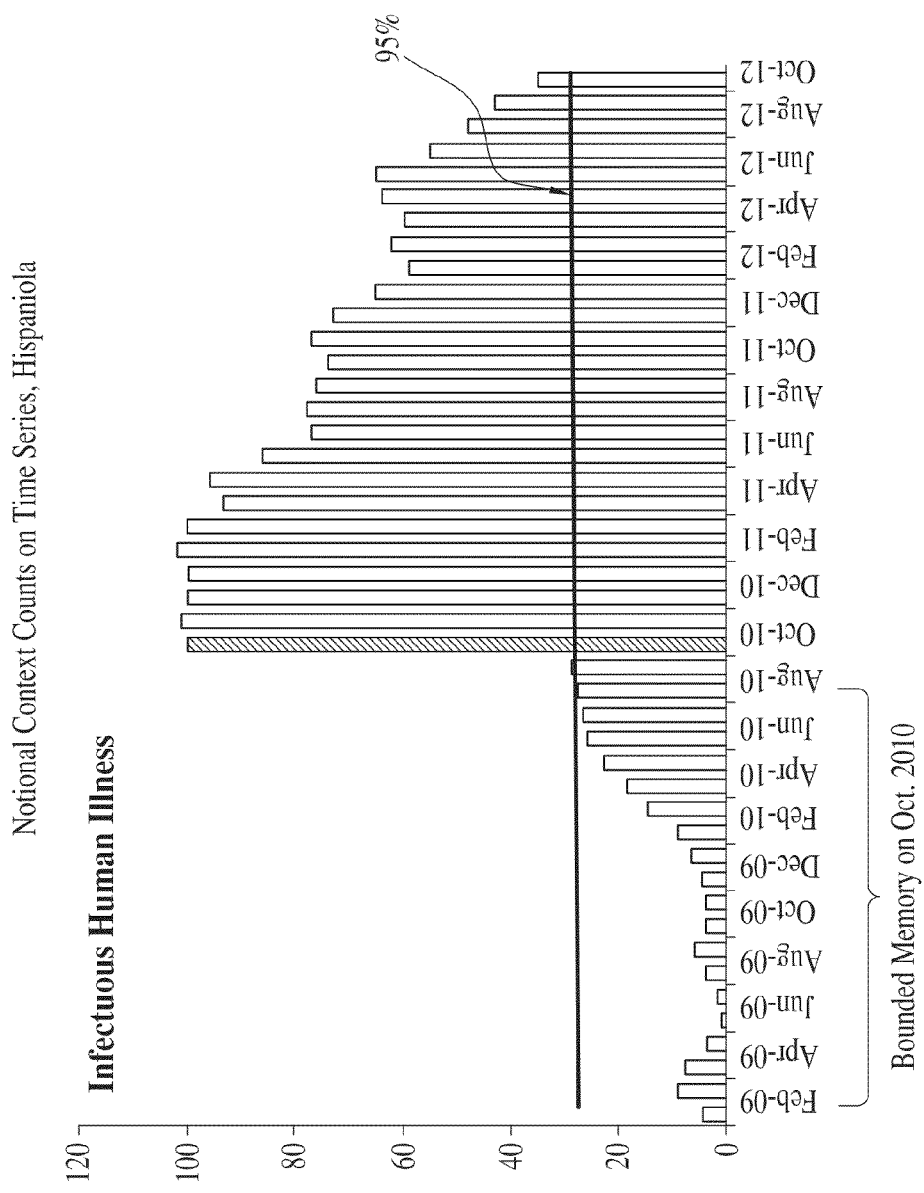
FIG. 18 is a graph use for event anomaly detection.

Given a Type I error probability, $\alpha$, a simple single-tailed or two-tailed hypothesis test can be accomplished using the histogram. Contexts assigned to event types within the clusters are classified anomalous at or greater than confidence $1-\alpha$, if:

a) the context features have never been previously observed, or b) the context's probability of occurrence based on the estimated PDF is less than $\alpha$: $P[X|X \epsilon C] < \alpha$, where C is the estimated PDF The general idea behind this nonparametric anomaly detection approach is that outliers reside in the tails of the distributions, beyond some minimum confidence threshold. While some noteworthy contexts may fall within the distributions of one or more of the feature dimensions (i.e. the "low and slow" indicators), if the context is anomalous only one dimension's anomaly test, it will be classified as anomalous. Anomalous contexts, however, are an expected outcome when observing a dynamic random process, and a small proportion of anomalies does not imply that the event type itself is anomalous. Furthermore, it is essential to re-cluster regularly to adapt to new contexts that have entered the histogram and the old contexts that have been purged. As shown in FIG. 18, events with context counts exceeding the 95% confidence threshold, in this example, are declared as anomalous and are stored in memory in the manner described below.

Correlation module 20 identifies the highly anomalous event types in clusters, i.e. event types that generate significantly more anomalies than the average number of anomalies with respect to its cluster (local scope) and all event types within all clusters (global scope). "Cohort event types" are event types that are themselves not anomalous event types, but are clustered with at least one anomalous event type. Since correlation has been used as a measure of association, there is no temporal or causal distinction between anomalous and cohort event types. By retaining cohort event types in an "anomaly template" (described in detail below), future instances of the original anomalous event type can be forecasted. An anomaly template, extracted by causation module 30, is an event type model formed by aggregating one or more realizations of similar anomalous event type clusters.

Due to the large amount of data, it is not feasible to store all contexts permanently in memory. An efficient mechanism for retaining data from just anomalous clusters is desirable. If the multidimensional histogram is analogous to short-term memory, the set of all anomaly templates represents the persistent memory of causation module 30. The anomaly template contains both event type clusters and the contexts from all anomalous and cohort event types. Causation Module 30 will use the anomaly templates to estimate conditional probabilities of co-occurring event types.

Figure 19:
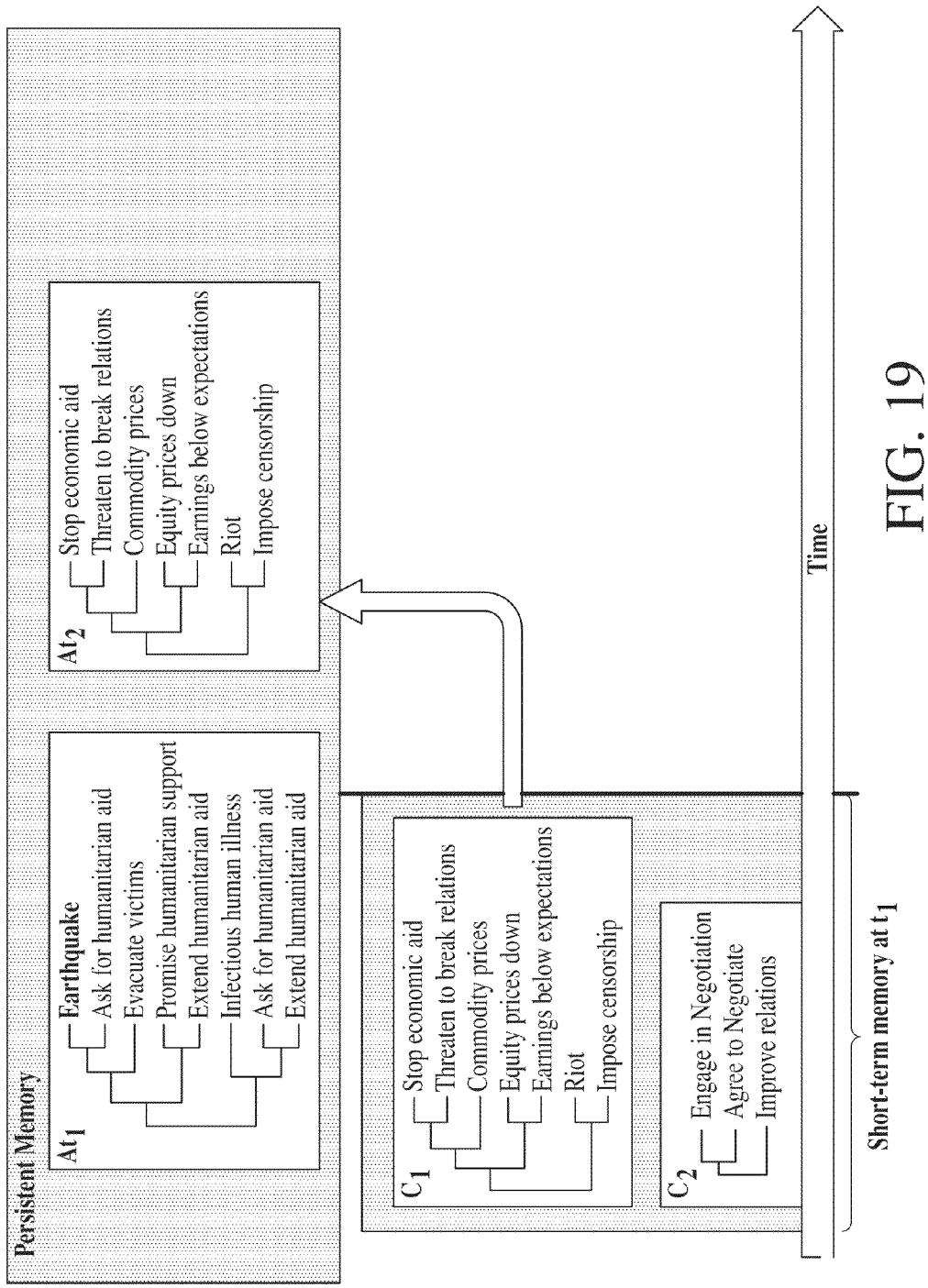
FIG. 19 is a snap shot representation of a memory at a first time.
Figure 20:
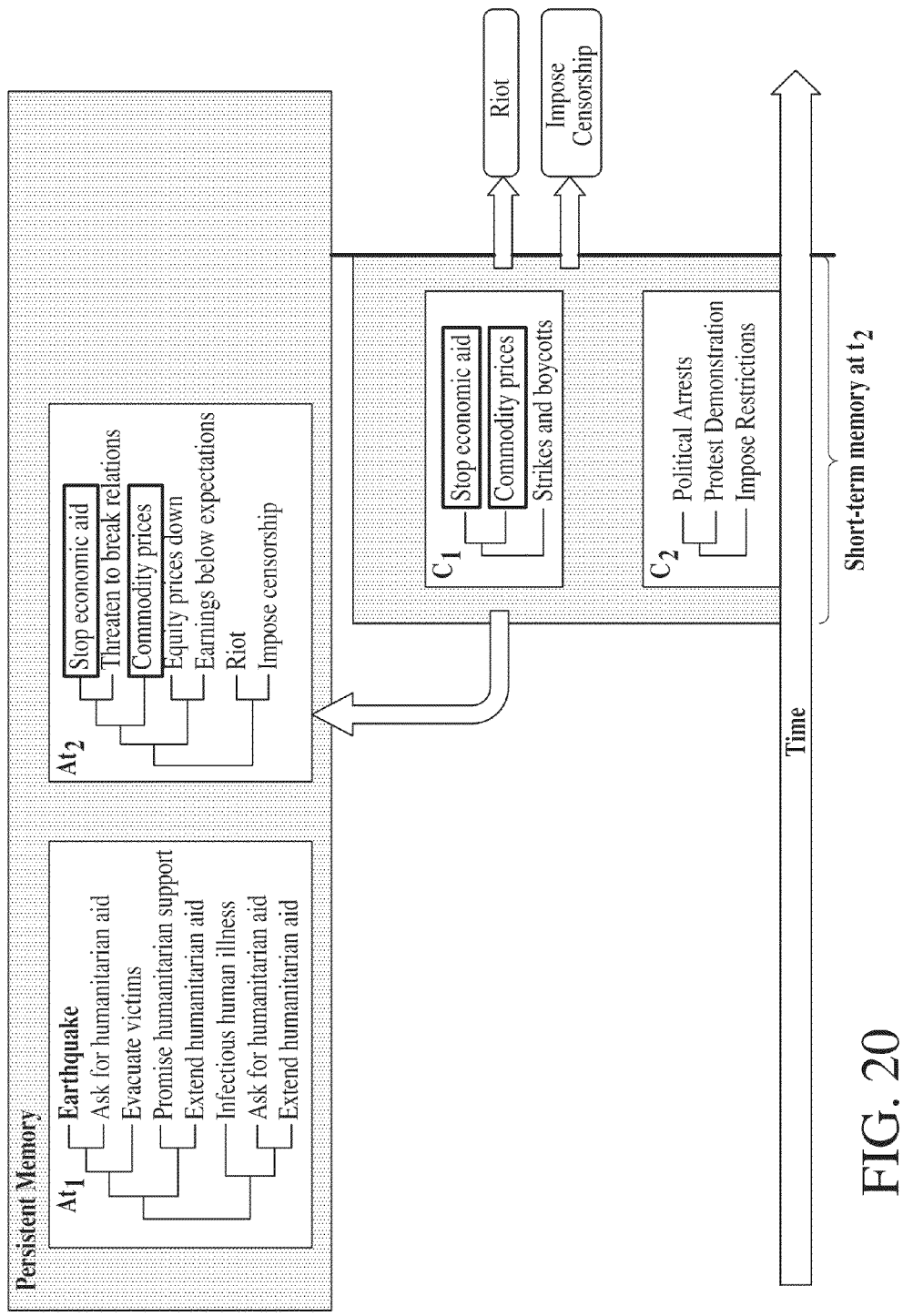
FIG. 20 is a snap shot representation of a memory at a second time.

Consider the state of the embodiment at time $t_1$, as shown in FIG. 19 which represents a data structure in memory of a computing device of the embodiment. At time $t_1$, an anomalous event type Riot is added to cluster $C_1$, with several indicative, but non-anomalous cohort event types. Since the anomaly template $At_1$ stored in persistent memory does not include the event type Riot, a new anomaly template, $At_2$, is formed from cluster $C_1$ and is inserted into persistent memory. The data contained in the multidimensional histogram of this embodiment only spans the region labeled "Short-term memory at $t_1$". In other words, only cluster $C_1$ and $C_2$ are stored. Later, as shown in FIG. 20, at time $t_2$, a new cluster $C_1$ is formed in the short-term memory from completely new data. Clustered event types Stop Economic Aid and Commodity Prices indicate that $C_1$ could be a new realization of $At_2$. Other members of $At_2$ are evaluated for causality (discussed below) and event types Riot and Impose Censorship emerge as possible future event types because they are included in anomaly template $At_2$ which has the clustered event types.

Figure 21:
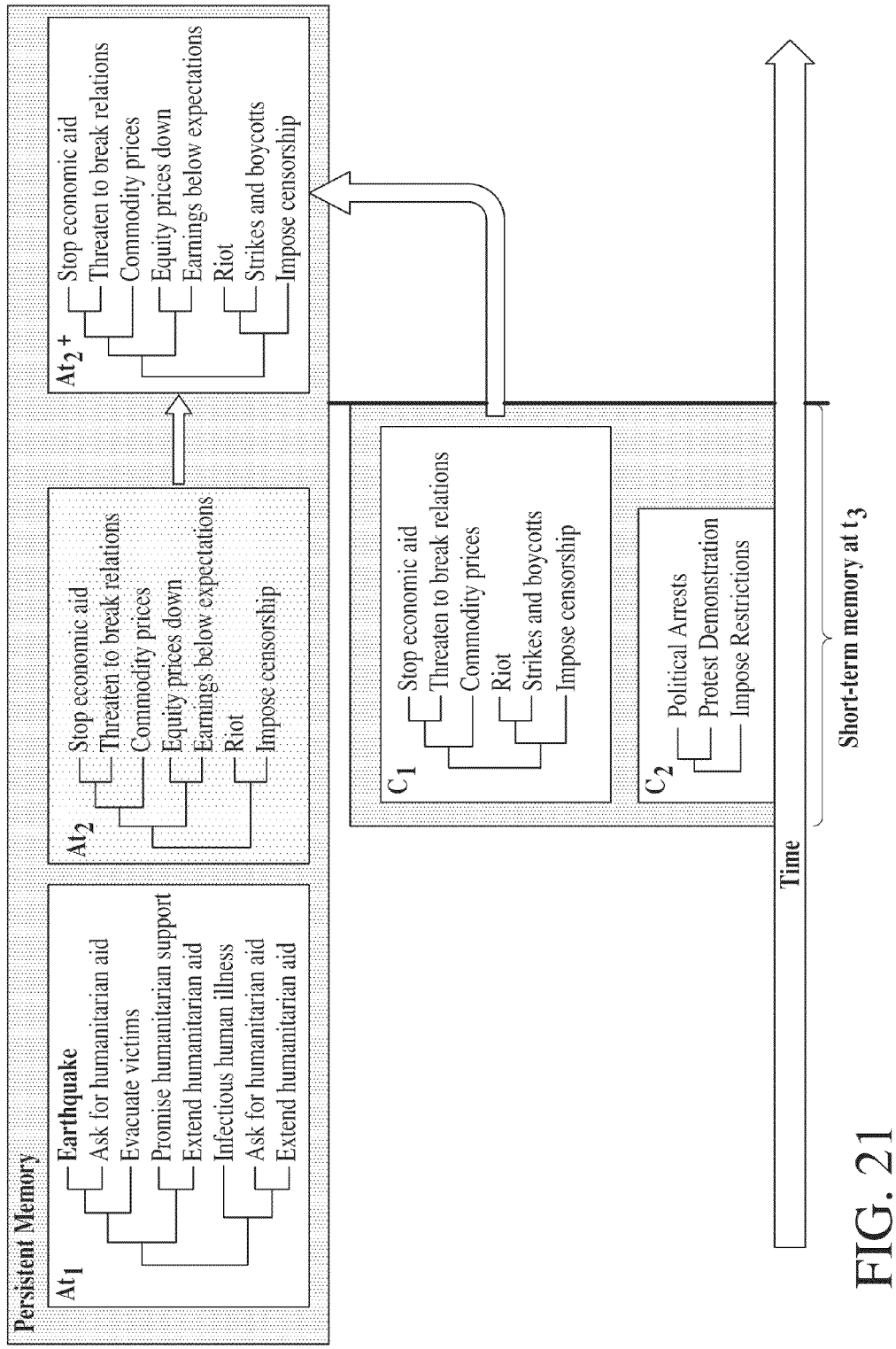
FIG. 21 is a snap shot representation of a memory at a third time.

At time $t_2$, cluster $C_1$ matches to anomaly template $At_2$, because both contain event types Stop Economic Aid and Commodity Prices. Other event types in $At_2$, Riot and Impose Censorship, are candidates for prediction. As the event types around cluster $C_1$ evolve, event types in $C_1$ have a high correlation with $At_2$, and $C_1$ is designated as a second realization of $At_2$. All data associated with $C_1$ are merged with $At_2$, and $At_2$ is re-clustered, forming $At_2+$. All subsequent realizations of $At_2$ strengthen the evidence and predictive certainty of $At_2$. FIG. 21 shows that, as event types around $C_1$ unfold at $t_3$, it is matched and designated as a new realization of $At_2$. New event type Strikes and Boycotts are added, and $At_2$ is re-clustered to updated Anomaly Template, $At_2$. This reclustering is performed by correlation module 20.

The anomaly templates can be used to form probabilities of other event types occurring. We can use the anomaly templates to estimate if these two event types form a new realization of $At_2$ by computing the conditional probability of $At_2$ given evidence of X=Stop Economic Aid and Y=Commodity Prices by aggregating context populations.

$$P(A_{t2} \mid X_1, Y) = \frac{P(A_{t2}, X, Y)}{P(X, Y)} = \frac{\text{Count of all } X, Y \text{ Contexts in } A_{t2}}{\sum \text{Count of all } X, Y \text{ in } C_k : \{X, Y\} \in C_k}$$

The Resolution, Source Filtering and Reduction components of Correlation module 20 of FIG. 1 provide users of the embodiment the ability to adjust and bias source inputs to tune the system to the desired precision and accuracy of the output.

Causation module 30 of FIG. 1 uses a novel method that employs Granger Causality to build a causality structure for Bayesian Belief Networks (BBN). The Causal Analysis leverages temporal sequencing methods that support causal inference, including an approach that exploits asymmetry in temporal distributions to estimate a causal sequence. BBNs are known to be useful as a tool for medical diagnostics and decision aides. The embodiment is based on the postulate that causation module 30 should form empirical event models by learning from patterns extracted from the stream of input contexts. With the empirical model, Prediction module 40 can predict new events based on having previously observed and learned similar event sequences. Therefore, a time ordered sequence of events should be established.

This section describes how multiple realizations can use and build upon the same Anomaly Template, At. Given an Anomaly Template, At, with correlated event types {A=Damage, B=Evacuate Victims, C=Earthquake,} formed by observing multiple realizations of one or more event types over time (e.g. Earthquake in 2010 and Earthquake in 2008), a temporal sequence of all event types in At, with respect to one reference event type in At can be established. Any event in At will have one or more contexts with time intervals defined by start time $t_s$ and end time $t_e$, from which a temporal histogram can be generated for each event. Each unique realization of the Anomaly Template, $At^{(j)}$, where j=1, represents the first realization of the Anomaly Template (e.g. Earthquake in 2008), j=2 represents the second realization (e.g. Earthquake in 2010), etc., can be defined. FIG. 22 shows an example of three realizations of At with the number of contexts reported for each event type. The "reference event type" can be defined as the event type with the highest information content across all realizations in At. In this example, it can be seen that event type C is the reference event type. All other event types in $At^{(j)}$ are aligned off of the median of its reference event type, and all event contexts are aggregated such that the median of all realizations of At are aligned against the same origin time, $t_{ref}$. This yields a set of temporal histograms for each event type in the anomaly template.

Figure 23:
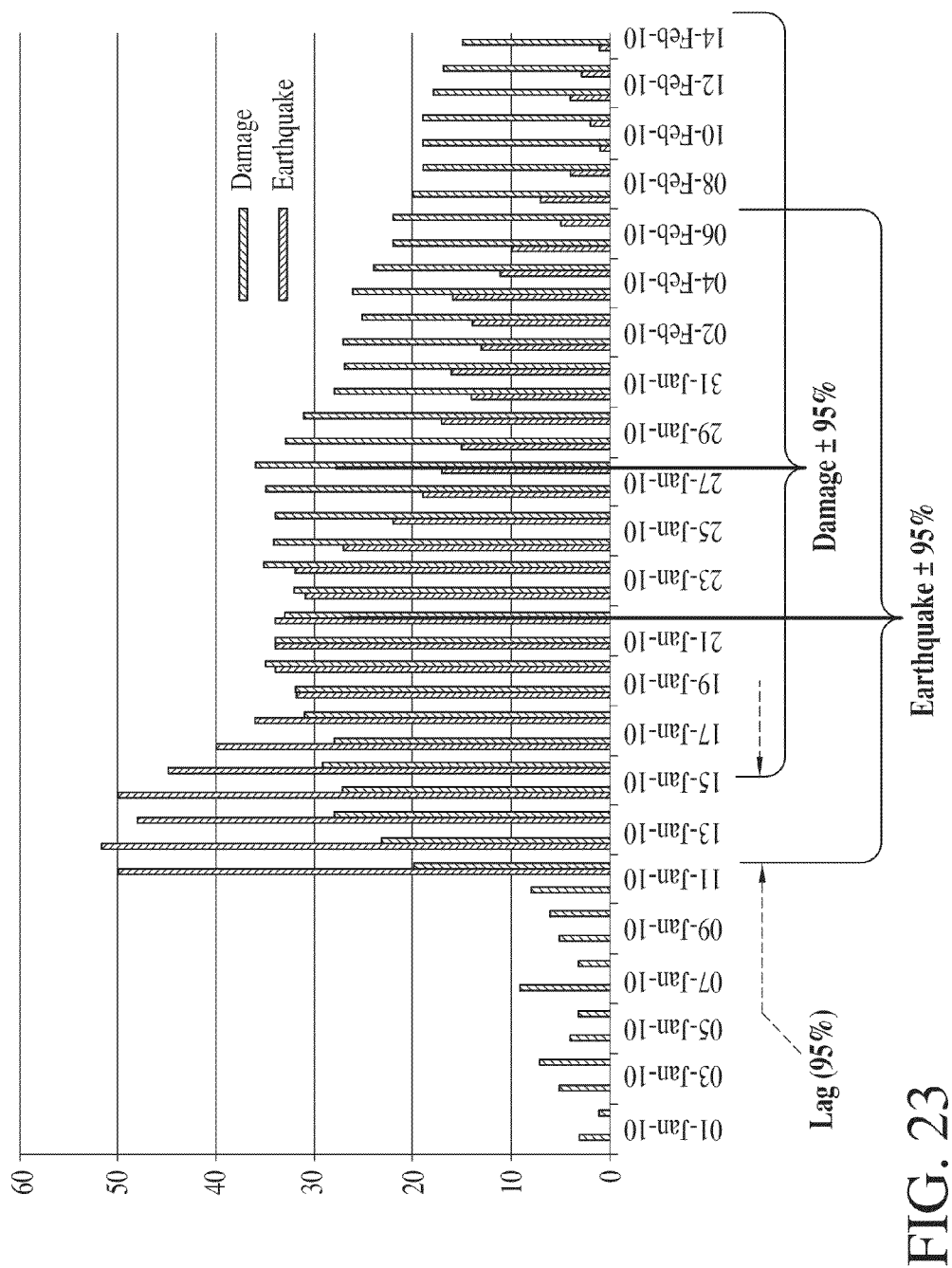
FIG. 23 is a temporal event graph.

This section describes how the temporal sequence of Event Types is established. FIG. 23 is a graph of Earthquake, as a reference event type, and Damage in a temporal analysis. The distributions of each event type pair (X,Y), Earthquake and Damage in this example, can be compared using standard statistical methods such as the difference in means and variances and information theoretic methods such as Kullback-Leibler Divergence, to determine the relative sequence, at some required confidence level (1−α), 95% in this example. Three possible outcomes/hypotheses are possible (Null Hypothesis: X and Y temporally coincide; Alternative Hypothesis 1: X precedes Y; or Alternative Hypothesis 2: Y precedes X). A feasible sequence of the example is that Earthquake precedes Damage. The lag specified at the confidence level determines the amount of time by which Earthquake precedes Damage; about 2 days in this example. Therefore, a recalled anomaly template can be used to estimate the time of predicted event types based on the occurrence of a reference event type.

This section describes how the temporal sequence can be used to estimate causality. The embodiment combines the concepts of Granger Causality and Mill's Methods to estimate causal relationship between every pair of correlated event types in the anomaly template. Granger Causality states a variable X may cause Y if and only if evidence of X happens first, followed by evidence of Y. It must also be shown that X can help predict Y, but Y cannot help predict X. The causal relationship that one or more event types $\{X1, X2, X3, \ldots\}$ cause Y ($\{X1, X2, X3, \ldots\} \Rightarrow Y$), limited to event types in At, if the following constraints hold:

1. Temporal Sequence Constraint: $P(Y \rightarrow \{X_1 \wedge X_2 \wedge \ldots\}) < \alpha$ Event Y is unlikely to precede any of its causal event types $\{X_1, X_2 \ldots\}$.

2. Prima Facie Constraint: $P(Y|X_1 \vee X_2 \vee \ldots \}) > P(Y)$ Event Y has a higher probability of occurrence if one or more causal events $\{X_1, X_2 \ldots\}$ were observed, than if no causal event types were observed.

3. Mill's Method of Agreement: $P(Y|X_1 \vee X_2 \vee \ldots \}) \leq 1-\alpha$ Given that any causal event type $\{X_1, X_2 \ldots\}$ exists, there is a high probability that Y will occur.

4. Mill's Method of Difference: $P(Y|\overline{X}_1 \wedge \overline{X}_2 \wedge \ldots) < \alpha$ If no causal event type is observed, then there is a low probability that Y will be observed.

5. Overlap Constraint: For any time $t \in \Delta_{At}$: $P(X,Y) > \delta$ For there to be a causal relationship between X and Y, the event type time distributions must overlap, based on the temporal sequence method.

Using the above constraints, a table of causal relationships can be constructed for each pair of event types in At, which form the edges of a BBN. First conditional probabilities are defined. For example, if we have concluded that Riots cause Arrests then:

$P(\text{Damage} \rightarrow \{\text{Riot} \wedge \text{Earthquake} \wedge \ldots\}) < 0.05$ [Temporal Sequence Constraint that states the Damage is unlikely to proceed an Earthquake or a Riot]

P(Arrest|Riot)>P(Arrest) Prima Facie example, higher probability of an arrest event given evidence of a riot event than the probability of just an arrest event occurring without any other evidence]

$P(\text{Arrest}|\text{Riot} \vee \text{Protest} \vee \ldots) > 0.95$ [Mill's Method of Agreement]

$P(\text{Arrest}|\text{No Riot} \wedge \text{No Protest} \ldots) < 0.05$ [Mill's Method of Difference]

Figure 24:
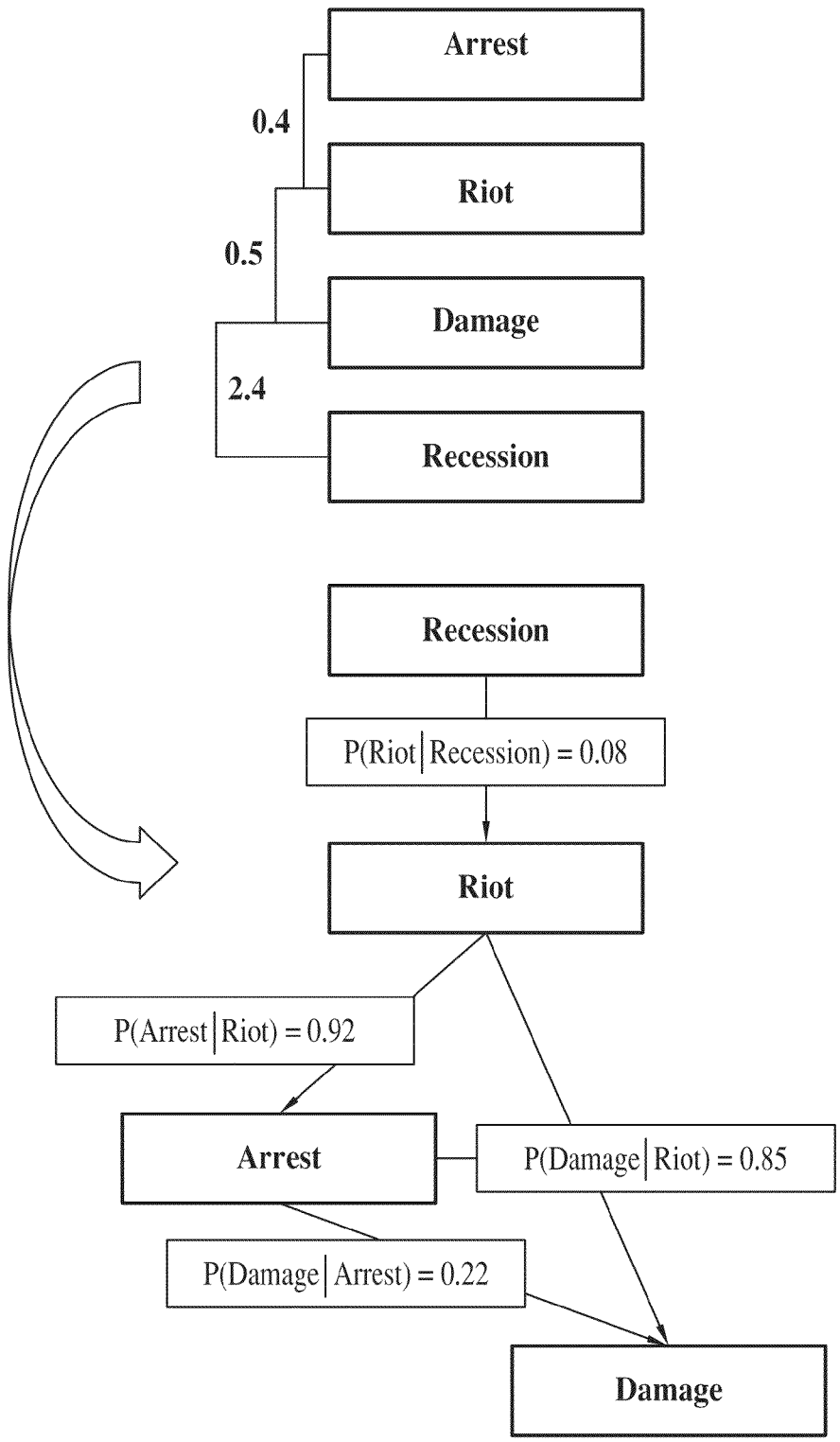
FIG. 24 is a graphical illustration of a BBN.

Each conditional probability is calculated, using the causal method described above, to create the BBN, an example of which is represented in part in FIG. 24. If causality constraints are recursively applied to the anomaly template to construct a BBN of event types. The BBN will provide a set of predicted event types with probabilities. Then the temporal sequence is applied to estimate the lead time distribution for each predicted event type. A BBN is an annotated Directed Acyclic Graph (DAG) that represents the joint probability distributions over a set of random variables. The edges of the graph indicate the causal dependency of the parent to the child node. At each node the conditional probabilities are annotated.

Given an anomaly template At, and the causal relationship constraints between the event types in At, a complete graph can be reduced into a BBN. If the network is small (around 30-40 event types), propagation can be performed exactly using exponential running time algorithms. However, with large networks, an approximate inference method that runs in polynomial time, such as Gibbs Sampling, is desirable because, in general, full summation over discrete variables has been shown to be NP-hard. The temporal distributions of the events in At described above provides a way to estimate the lead time of each predicted event. A confidence bounds for time estimation can be provided that will define the earliest start time to latest start time of any predicted event type. By performing a simple graph traversal from the observed event types forward and extracting the start time windows, we can overlay the event type and its probability of occurrence on a time line.

Figure 25:
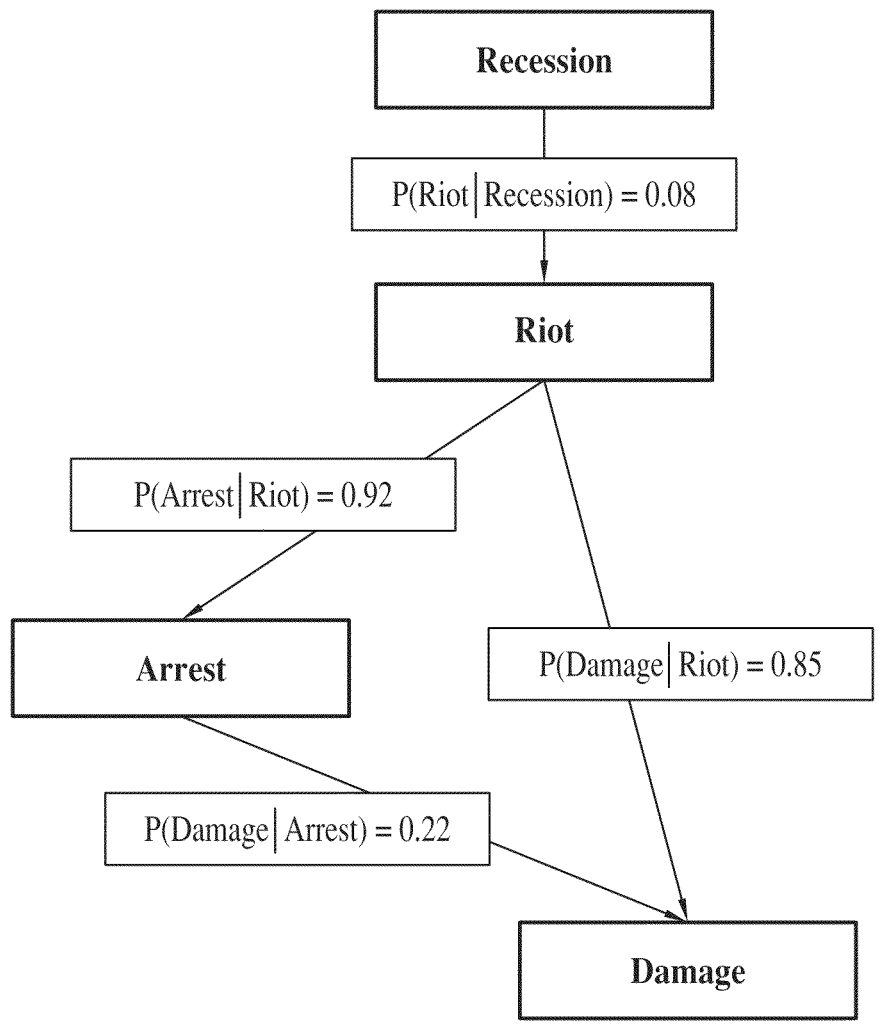
FIG. 25 illustrates correlated events extracted from an anomaly template.
Figure 26:
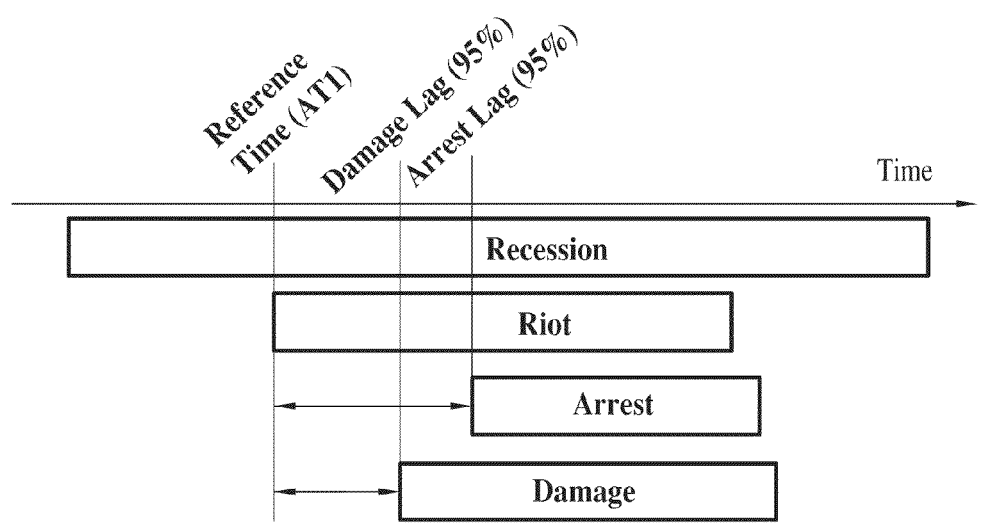
FIG. 26 is a timeline of extracted events.

As an example, suppose that a context is received with an event type of Riot, a location of Havana, and a date of 14 May 2013. The appropriate anomaly template is recalled, Riot is placed on the current timeline, correlated event types that exceed the probability threshold are extracted and are placed on the timeline with the appropriate lag (positive lag indicates a future event, negative lag indicates a previous event). FIG. 25 illustrates the extracted correlated event types that are extracted from $AT_1$. FIG. 26 illustrates the timeline of correlated event types in this example. In this manner, Arrest events of urban poor on August 16 can be predicted with a 92% confidence. Similarly, Damage events to public property in Havana can be predicted with 85% confidence.

The embodiment provides a solution method that can harvest a diverse set of unstructured media sources, extract linguistic features and create event context messages having event types. The event types are then correlated and clustered. Non-parametric density estimation is used to develop a model of usual patterns of behavior and isolate anomalies, or changes to behavior. Anomalous event types and other correlated event types are learned and stored in persistent memory. In future realizations of similar indicator event types, past memory will be recalled and the surrounding event types will serve as a basis to predict future events with location and population and probabilities and lead times. The embodiment provides a method and system that is largely unbiased by pre-existing social or anthropological models that might normally assert classification taxonomies or rely on assumed cause-and-effect relationships in social systems.

By not introducing significant bias through models, semantics, or rules the embodiment can rely on machine learning to derive an unconstrained detailed structure that describes what is normal, what is unusual, and what is causal. Sustained unusual behavior is allowed to become the new "normal" while also being compared to a long-term memory of past experiences and significant events in an effort to discover meaningful patterns. Similarities and differences are inferred and scored for relevance as predictors.

The embodiment shifts the paradigm for creating and analyzing social behaviors and events from static models and rules-based decisions to a nearly infinitely dynamic machine learning approach for predictive analytics, limited only by the degree of change in social behavior and scalability of the analytic information technology infrastructure. The embodiment offers advantages similar to traditional Artificial Intelligence (AI) architectures without the disadvantages, such as trainer bias and overly constrained models. The embodiment also identifies, uses, and quantifies associative and causal relationships that heretofore have gone undiscovered or have been underutilized, often due to limiting initial conditions and biases that are integral to other approaches. The embodiment replaces the human in the loop where tacit knowledge can be used to make inferences, predictions, or judgments. The embodiment derives and exploits subtle indicators for predicting significant future events and provides a statistical rationale for predictions with quantitative traceability to the indicators. The embodiment provides rapid detection of disruptive influences in noisy but moderately stable systems, especially effective when influences are small and could be easily misjudged by a human observer. The embodiment provides strong coverage of "blind spots" that exist in traditional methods of open source analysis due to model bias or attention bias, constantly adapts its empirical models to the changing data environment and improves predictive capability with increasing data over time.

What is claimed:

1. A method for predicting significant future events based on previous events, comprising:
    receiving plural messages representing events, each message including an event type attribute, a time attribute, a population attribute, and a semantic attribute;
    mapping the attributes of the messages to respective feature dimensions to define a multidimensional histogram;
    determining co-occurrence of at least two event types based on queries of the multidimensional histogram;
    clustering correlated event types based on the corresponding event type attributes using a multiple assignment hierarchal clustering algorithm;
    estimating a probability density function corresponding to multiple feature dimensions for each cluster of related event types;
    detecting anomalous event types from the messages by comparing feature dimensions of incoming messages to the probability density functions of the cluster corresponding to the event type of the incoming messages;
    identifying highly anomalous event types in clusters based on the probability density functions;
    aggregating similar anomalous event type clusters to create an anomaly template of multiple pairs of event types;
    establishing a temporal sequence of each event type in the anomaly template;
    estimating causal relationships between each pair of event types in the anomaly template;
    constructing a Bayesian belief network of the pairs of event types;
    predicting a significant event by applying the Bayesian belief network to an incoming message; and
    applying event types from the Bayesian belief network onto a timeline to establish a sequential set of events related to the significant event.

2. A method for constructing a belief network for predicting significant future events based on previous events, comprising:
    receiving plural messages representing events, each message including an event type attribute, a time attribute, a population attribute, and a semantic attribute;
    mapping the attributes of the messages to respective feature dimensions to define a multidimensional histogram;
    determining co-occurrence of at least two event types based on queries of the multidimensional histogram;
    clustering correlated event types based on the corresponding event type attributes using a multiple assignment hierarchal clustering algorithm;
    estimating a probability density function corresponding to multiple feature dimensions for each cluster of related event types;
    detecting anomalous event types from the messages by comparing feature dimensions of incoming messages to the probability density functions of the cluster corresponding to the event type of the incoming messages;
    identifying highly anomalous event types in clusters based on the probability density functions;
    aggregating similar anomalous event type clusters to create an anomaly template of multiple pairs of events;
    establishing a temporal sequence of each event type in the anomaly template;
    estimating causal relationships between each pair of event types in the anomaly template; and
    constructing a Bayesian belief network of the pairs of event types.

3. A method for predicting significant future events based on previous events, comprising:
    receiving plural messages representing events, each message including an event type attribute, a time attribute, a population attribute, and a semantic attribute;
    predicting a significant event by applying a Bayesian belief network to an incoming message; and
    applying events from the Bayesian belief network onto a timeline to establish a sequential set of event types related to the significant event type;
    wherein the Bayesian belief network is created by:
    receiving plural messages representing events, each message including an event type attribute, a time attribute, a population attribute, and a semantic attribute;
    mapping the attributes of the messages to respective feature dimensions to define a multidimensional histogram;
    determining co-occurrence of at least two event types based on queries of the multidimensional histogram;
    clustering correlated event types based on the corresponding event type attributes using a multiple assignment hierarchal clustering algorithm;
    estimating a probability density function corresponding to multiple feature dimensions for each cluster of related event types;
    detecting anomalous event types from the messages by comparing feature dimensions of incoming messages to the probability density functions of the cluster corresponding to the event type of the incoming messages;
    identifying highly anomalous event types in clusters based on the probability density functions;
    aggregating similar anomalous event type clusters to create an anomaly template of multiple pairs of event types;
    establishing a temporal sequence of each event type in the anomaly template; and estimating causal relationships between each pair of event types in the anomaly template.

4. A system for predicting significant future events based on previous events, comprising:
- at least one processor;
- at least one memory operatively coupled to at least one of the at least one processors and having computer readable instructions stored thereon, the instructions, when executed by at least one of the at least one processors, cause the at least one processors to:
  - receive plural messages representing events, each message including an event type attribute, a time attribute, a population attribute, and a semantic attribute;
  - map the attributes of the messages to respective feature dimensions to define a multidimensional histogram;
  - determine co-occurrence of at least two event types based on queries of the multidimensional histogram;
  - cluster correlated event types based on the corresponding event type attributes using a multiple assignment hierarchal clustering algorithm;
  - estimate a probability density function corresponding to multiple feature dimensions for each cluster of related event types;
  - detect anomalous event types from the messages by comparing feature dimensions of incoming messages to the probability density functions of the cluster corresponding to the event type of the incoming messages;
  - identify highly anomalous event types in clusters based on the probability density functions;
  - aggregate similar anomalous event type clusters to create an anomaly template of multiple pairs of event types;
  - establish a temporal sequence of each event type in the anomaly template;
  - estimate causal relationships between each pair of event types in the anomaly template;
  - construct a Bayesian belief network of the pairs of event types;
  - predict a significant event by applying the Bayesian belief network to an incoming message; and
  - apply event types from the Bayesian belief network onto a timeline to establish a sequential set of events related to the significant event.

5. A system for constructing a belief network for predicting significant future events based on previous events, comprising:
- at least one processor;
- at least one memory operatively coupled to at least one of the at least one processors and having computer readable instructions stored thereon, the instructions, when executed by at least one of the at least one processors, cause the at least one processors to:
  - receive plural messages representing events, each message including an event type attribute, a time attribute, a population attribute, and a semantic attribute;
  - map the attributes of the messages to respective feature dimensions to define a multidimensional histogram;
  - determine co-occurrence of at least two event types based on queries of the multidimensional histogram;
  - cluster correlated event types based on the corresponding event type attributes using a multiple assignment hierarchal clustering algorithm;
  - estimate a probability density function corresponding to multiple feature dimensions for each cluster of related event types;
  - detect anomalous event types from the messages by comparing feature dimensions of incoming messages to the probability density functions of the cluster corresponding to the event type of the incoming messages;
  - identify highly anomalous event types in clusters based on the probability density functions;
  - aggregate similar anomalous event type clusters to create an anomaly template of multiple pairs of events;
  - establish a temporal sequence of each event type in the anomaly template;
  - estimate causal relationships between each pair of event types in the anomaly template; and
  - construct a Bayesian belief network of the pairs of event types.

6. A system for predicting significant future events based on previous events, comprising:
- at least one processor;
- at least one memory operatively coupled to at least one of the at least one processors and having computer readable instructions stored thereon, the instructions, when executed by at least one of the at least one processors, cause the at least one processors to:
- receive plural messages representing events, each message including an event type attribute, a time attribute, a population attribute, and a semantic attribute;
- predict a significant event by applying a Bayesian belief network to an incoming message; and
- apply events from the Bayesian belief network onto a timeline to establish a sequential set of event types related to the significant event type;
- wherein the Bayesian belief network is created by:
  - receiving plural messages representing events, each message including an event type attribute, a time attribute, a population attribute, and a semantic attribute;
  - mapping the attributes of the messages to respective feature dimensions to define a multidimensional histogram;
  - determining co-occurrence of at least two event types based on queries of the multidimensional histogram;
  - clustering correlated event types based on the corresponding event type attributes using a multiple assignment hierarchal clustering algorithm;
  - estimating a probability density function corresponding to multiple feature dimensions for each cluster of related event types;
  - detecting anomalous event types from the messages by comparing feature dimensions of incoming messages to the probability density functions of the cluster corresponding to the event type of the incoming messages;
  - identifying highly anomalous event types in clusters based on the probability density functions;
  - aggregating similar anomalous event type clusters to create an anomaly template of multiple pairs of event types;
  - establishing a temporal sequence of each event type in the anomaly template; and
  - estimating causal relationships between each pair of event types in the anomaly template.

* * * * *